(12) United States Patent
Wells-Quinn et al.

(10) Patent No.: US 12,514,649 B2
(45) Date of Patent: Jan. 6, 2026

(54) SYSTEMS AND METHODS FOR FACILITATING VISUAL ASSESSMENT OF REGISTRATION ACCURACY

(71) Applicant: 7D SURGICAL ULC, Toronto (CA)

(72) Inventors: Thomas Anthony Wells-Quinn, Richmond (AU); Adrian Mariampillai, Toronto (CA); Michelle May See Leung, Toronto (CA); Kenneth Kuei-Ching Lee, Toronto (CA); Julia Marie Prince, Toronto (CA); Michael K. K. Leung, Markham (CA); Beau Anthony Standish, Toronto (CA); Victor X. D. Yang, North York (CA)

(73) Assignee: 7D SURGICAL ULC, Toronto (CA)

( * ) Notice: Subject to any disclaimer, the term of this patent is extended or adjusted under 35 U.S.C. 154(b) by 185 days.

(21) Appl. No.: 18/024,663

(22) PCT Filed: Aug. 19, 2021

(86) PCT No.: PCT/CA2021/051151
§ 371 (c)(1),
(2) Date: Mar. 3, 2023

(87) PCT Pub. No.: WO2022/047572
PCT Pub. Date: Mar. 10, 2022

(65) Prior Publication Data
US 2024/0024033 A1 Jan. 25, 2024

Related U.S. Application Data

(60) Provisional application No. 63/074,971, filed on Sep. 4, 2020.

(51) Int. Cl.
*A61B 34/20* (2016.01)
*A61B 90/00* (2016.01)

(52) U.S. Cl.
CPC .............. *A61B 34/20* (2016.02); *A61B 90/39* (2016.02); *A61B 2034/2057* (2016.02); *A61B 2090/3983* (2016.02)

(58) Field of Classification Search
CPC . A61B 34/20; A61B 90/39; A61B 2034/2057; A61B 2090/3983; A61B 2034/2055; A61B 2034/2068
See application file for complete search history.

(56) References Cited

U.S. PATENT DOCUMENTS

| 9,990,776 B2 | 6/2018 | Jagga et al. |
| 10,339,719 B2 | 7/2019 | Jagga et al. |

(Continued)

FOREIGN PATENT DOCUMENTS

| WO | 2018006167 A1 | 1/2018 | |
| WO | 2019128961 A1 | 7/2019 | |
| WO | WO-2021007418 A2 * | 1/2021 | ............. A61B 34/10 |

OTHER PUBLICATIONS

The International Search Report for PCT/CA2021/051151 dated Nov. 9, 2021.

*Primary Examiner* — Kaitlyn E Sebastian
(74) *Attorney, Agent, or Firm* — Stephen Leonard; Aird & McBurney LP

(57) ABSTRACT

Systems and methods are provided that facilitate an intraoperative assessment of registration associated with a trackable reference frame. An initial position of the landmark is identified and an initial position and orientation of the trackable reference frame is determined. The position and orientation of the trackable reference frame is subsequently trance and estimated updated position of the landmark is determined by maintaining a fixed three-dimensional offset between the landmark and the trackable frame of reference. An annotation indicating the estimated updated position of the landmark is displayed, such as within an intraoperative (Continued)

image acquired by a camera having a known spatial relationship with the tracking system. A user may visually observe a registration error by observing a lack of spatial concordance between the actual location of the landmark the estimated updated location as indicated by the annotation. The annotation may be generated based on previously acquired surface data.

26 Claims, 20 Drawing Sheets

(56) References Cited

U.S. PATENT DOCUMENTS

| | | | |
|---|---|---|---|
| 10,463,434 B2 | 11/2019 | Siegler et al. | |
| 10,463,447 B2 | 11/2019 | Sela et al. | |
| 2004/0171924 A1* | 9/2004 | Mire | A61B 34/20 |
| | | | 600/407 |
| 2008/0123910 A1* | 5/2008 | Zhu | A61B 34/20 |
| | | | 382/128 |
| 2013/0245461 A1* | 9/2013 | Maier-Hein | A61B 90/361 |
| | | | 600/476 |
| 2016/0000515 A1 | 1/2016 | Sela et al. | |
| 2016/0100773 A1 | 4/2016 | Ching et al. | |
| 2018/0153626 A1 | 6/2018 | Yang et al. | |
| 2018/0185100 A1* | 7/2018 | Weinstein | A61F 2/461 |
| 2020/0069373 A1* | 3/2020 | Yu | A61B 34/10 |
| 2021/0153953 A1 | 5/2021 | Mariampillai et al. | |

* cited by examiner

SYSTEMS AND METHODS FOR FACILITATING VISUAL ASSESSMENT OF REGISTRATION ACCURACY

CROSS-REFERENCE TO RELATED APPLICATION

This application is a National Phase application claiming the benefit of the international PCT Patent Application No. PCT/CA2021/051151, filed on Aug. 19, 2021, in English, which claims priority to U.S. Provisional Patent Application No. 63/074,971, titled "SYSTEMS AND METHODS FOR FACILITATING VISUAL ASSESSMENT OF REGISTRATION ACCURACY" and filed on Sep. 4, 2020, the entire contents of which are incorporated herein by reference.

BACKGROUND

The present disclosure relates to navigated medical procedures.

Navigation enables the surgeon to visualize the position and orientation of a medical instrument relative to the anatomy of a patient. In order to visualize the position and orientation of the medical instrument, fiducial markers are attached to the medical instrument such that signals from the fiducial markers can be detected by cameras or other sensing devices (e.g. electromagnetic tracking devices), and the position and orientation of the medical instrument can be triangulated. The accuracy of such guidance depends on the ability to maintain registration between the frame of reference of the tracking system and a local reference frame associated with the patient.

SUMMARY

Systems and methods are provided that facilitate an intraoperative assessment of registration associated with a trackable reference frame. An initial position of the landmark is identified and an initial position and orientation of the trackable reference frame is determined. The position and orientation of the trackable reference frame is subsequently tracked and an estimated updated position of the landmark is determined by maintaining a fixed three-dimensional offset between the landmark and the trackable frame of reference. An annotation indicating the estimated updated position of the landmark is displayed, such as within an intraoperative image acquired by a camera having a known spatial relationship with the tracking system. A user may visually observe a registration error by observing a lack of spatial concordance between the actual location of the landmark the estimated updated location as indicated by the annotation. The annotation may be generated based on previously acquired surface data.

Accordingly, in one aspect, there is provided a method of generating a visible indication of registration accuracy during a medical procedure, the method comprising:
  employing a tracking system to detect an initial position and orientation of a trackable reference frame secured relative to a subject;
  obtaining landmark position information facilitating a determination of a corresponding initial position of a landmark relative to the trackable reference frame, wherein the landmark is visible on the subject and is absent of fiducial markers trackable by the tracking system; and
  at a subsequent time during the medical procedure:
    employing the tracking system to detect an updated position and orientation of the trackable reference frame;
    employing the updated position and orientation of the trackable reference frame to determine an estimated updated position of the landmark such that the estimated updated position of the landmark remains fixed relative to the trackable reference frame; and
    generating the visible indication of the estimated updated position of the landmark such that the estimated updated position of the landmark is observable relative to an actual position of the landmark, thereby facilitating visual detection of registration error due to motion of the trackable reference frame relative to the subject via observation of an offset between the estimated updated position of the landmark and the actual position of the landmark.

In some example implementations of the method, the landmark position information comprises a first location identified within a first camera image and a second location identified within a second camera image, wherein the first camera image is obtained from a first camera having a first view angle and the second camera image is obtained from a second camera having a second view angle, wherein the first camera image and the second camera image include the landmark, the first camera being fixed relative to the second camera; and
  wherein the first location and the second location are processed to determine the initial position of the landmark, such that the initial position of the landmark and the initial position and orientation of the trackable reference frame are represented in a common frame of reference.

The landmark position information may be obtained by: receiving, from a user, via a graphical user interface, first input identifying the first location of the landmark within the first camera image; and receiving, from the user, via the graphical user interface, second input identifying the second location of the landmark within the second camera image.

The landmark position information may be obtained by: receiving, from a user, via a graphical user interface, first input identifying the first location of the landmark within the first camera image; and employing one or more features associated with the landmark in the first camera image to: (i) process the second camera image and identify the landmark within the second camera image; and (ii) determine the second location of the landmark within the second camera image.

The landmark position information may be obtained by: obtaining the first camera image and the second camera image while a pointing instrument is positioned, by a user, to indicate the landmark, such that the first camera image and the second camera image include the pointing instrument and the landmark; and processing the first camera image and the second camera image to identify, based on one or more known properties associated with the pointing instrument, the landmark and to determine a first selected location and second selected location of the landmark within the first camera image and the second camera image, respectively.

A known transformation between (i) a frame of reference associated with the first camera and the second camera and (ii) a frame of reference of the tracking system, may be employed to represent the initial position of the landmark and the initial position and orientation of the trackable reference frame in the common frame of reference, thereby facilitating the determination of the initial position of the landmark relative to the trackable reference frame.

The first camera and the second camera may be components of the tracking system, such that the initial position of the landmark and the initial position and orientation of the trackable reference frame inherently reside within the common frame of reference.

In some example implementations of the method, the landmark position information is obtained by receiving, from the tracking system, tracking information identifying a position and orientation of a trackable instrument when the trackable instrument is positioned, by a user, to indicate the landmark; and wherein the position and orientation of the trackable instrument are employed to determine the initial position of the landmark in a frame of reference of the tracking system. The trackable instrument may be configured to project an optical beam from a distal end thereof, and wherein the trackable instrument comprises a distance sensor configured to determine a distance between the distal end and the intersection of the optical beam with a surface; and wherein the position and orientation of the trackable instrument, and the distance measured by the distance sensor, when the optical beam is directed at the landmark, are employed to determine the location of the landmark in the frame of reference of the tracking system.

In some example implementations of the method, the visible indication is generated in as annotation within an image displayed on a user interface, the image having been acquired by a camera having a known spatial relationship with the tracking system, wherein the image includes the landmark. The annotation may spatially overlap with the estimated updated position of the landmark. The annotation may provide an indication of the estimated updated position of the landmark without spatially overlapping with the estimated updated position of the landmark. The annotation may be based on a computed virtual elongate object that spatially extends from the estimated updated position of the landmark. The annotation may be generated based on a projection of a virtual elongate object that spatially extends a location residing less than 5 mm from the estimated updated position of the landmark.

An orientation of the virtual elongate object may be selected such that in the absence of registration inaccuracy, the annotation appears in the image as a dot, and such that in the presence of registration inaccuracy, the annotation appears as a segment.

An orientation of the virtual elongate object, in the absence of registration inaccuracy, may be selected according to an orientation of the camera.

The location of the annotation within the image may be determined by employing a known transformation between a frame of reference of the tracking system and a frame of reference of the camera. The camera may be rigidly mounted relative to the tracking system. The camera may be a component of the tracking system.

In some example implementations of the method, the visible indication is generated by controlling a light source to direct an optical beam toward the location of the landmark on the subject.

In some example implementations of the method, the landmark is an anatomical landmark.

In some example implementations of the method, the landmark is a non-anatomical landmark residing on an object secured to the subject. The object may be an implant. The landmark may be a feature residing on an implant. The implant may be a bone screw.

In another aspect, there is provided a system for generating a visible indication of registration accuracy during a medical procedure, the system comprising:
control and processing circuitry comprising at least one processor and associated memory, said memory comprising instructions executable by said at least one processor for performing operations comprising:
controlling a tracking system to detect an initial position and orientation of a trackable reference frame secured relative to a subject;
receiving landmark position information facilitating a determination of a corresponding initial position of a landmark relative to the trackable reference frame;
subsequently controlling the tracking system to detect an updated position and orientation of the trackable reference frame;
processing the updated position and orientation of the trackable reference frame to determine an estimated updated position of the landmark such that the estimated updated position of the landmark remains fixed relative to the trackable reference frame; and
controlling one of a display device and an optical device to generate the visible indication of the estimated updated position of the landmark such that the estimated updated position of the landmark is observable relative to an actual position of the landmark, thereby facilitating visual detection of registration error due to motion of the trackable reference frame relative to the subject via observation of an offset between the estimated updated position of the landmark and the actual position of the landmark.

In some example implementations of the system, the control and processing circuitry is operably coupled to a first camera having a first view angle and a second camera having a second view angle; wherein said control and processing circuitry is further configured such that the landmark position information comprises a first location of the landmark within a first camera image and a second location of the landmark identified within a second camera image, the first camera image being obtained from the first camera and the second camera image being obtained from the second camera; and
wherein said control and processing circuitry is further configured to process the first location and the second location to determine the initial position of the landmark, such that the initial position of the landmark and the initial position and orientation of the trackable reference frame are represented in a common frame of reference.

The control and processing circuitry may be further configured such that the landmark position information is obtained by: receiving, from a user, via a graphical user interface, first input identifying the first location of the landmark within the first camera image; and receiving, from the user, via the graphical user interface, second input identifying the second location of the landmark within the second camera image.

The control and processing circuitry may be further configured such that the landmark position information is obtained by: receiving, from a user, via a graphical user interface, first input identifying the first location of the landmark within the first camera image; and employing one or more features associated with the landmark in the first camera image to: (i) process the second camera image and identify the landmark within the second camera image; and (ii) determine the second location of the landmark within the second camera image.

The control and processing circuitry may be further configured such that a known transformation between (i) a frame of reference associated with the first camera and the second camera and (ii) a frame of reference of the tracking system, is employed to represent the initial position of the landmark and the initial position and orientation of the trackable reference frame in the common frame of reference, thereby facilitating the determination of the initial position of the landmark relative to the trackable reference frame.

The first camera and the second camera are components of the tracking system, such that the initial position of the landmark and the initial position and orientation of the trackable reference frame inherently reside within the common frame of reference.

In some example implementations of the system, the control and processing circuitry is further configured such that the landmark position information is obtained by receiving, from the tracking system, tracking information identifying a position and orientation of a trackable instrument positioned, by a user, to indicate the landmark; and wherein the position and orientation of the trackable instrument are employed to determine the initial position of the landmark in a frame of reference of the tracking system.

In some example implementations of the system, the control and processing circuitry is operably coupled to a camera having a known spatial relationship with the tracking system, and wherein said control and processing circuitry is configured to acquire an image from the camera and generate, on the display device, the visible indication as annotation within the image. The control and processing circuitry may be further configured such that the location of the annotation within the image is determined by employing a known transformation between a frame of reference of the tracking system and a frame of reference of the camera.

In some example implementations of the system, the control and processing circuitry is further configured such that the visible indication is generated by controlling the optical device to direct an optical beam toward the location of the landmark on the subject.

In another aspect, there is provided a method of detecting registration inaccuracy during a medical procedure, the method comprising:
  employing a tracking system to detect an initial position and orientation of a trackable reference frame secured relative to a subject;
  obtaining an initial intraoperative image from a camera, the initial intraoperative image including a landmark, wherein the landmark is visible on the subject and is absent of fiducial markers trackable by the tracking system;
  obtaining landmark position information facilitating a determination of a corresponding initial position of the landmark relative to the trackable reference frame;
  processing an initial landmark image region within the initial intraoperative image to generate a feature descriptor associated with the landmark, the initial landmark image region including at least a portion of the landmark; and
  at a subsequent time during the medical procedure:
    employing the tracking system to detect an updated position and orientation of the trackable reference frame;
    employing the updated position and orientation of the trackable reference frame to determine an estimated updated position of the landmark such that the estimated updated position of the landmark remains fixed relative to the trackable reference frame;
    obtaining an updated intraoperative image;
    processing the updated intraoperative image according to the feature descriptor to determine an intra-image updated location of the landmark within the updated intraoperative image; and
    processing the estimated updated position of the landmark and the intra-image updated location of the landmark to detect a registration error due to motion of the trackable reference frame relative to the subject.

In some example implementations of the method, the registration error is detected by: employing a known coordinate transformation between a frame of reference of the tracking system and a frame of reference of the camera to represent the estimated updated position of the landmark within the updated intraoperative image; determining a spatial offset within the updated intraoperative image between the estimated updated position of the landmark and the intra-image updated location of the landmark; and determining that the spatial offset exceeds a threshold indicative of a loss of registration.

In some example implementations of the method, the updated intraoperative image is a first updated intraoperative image obtained from a first camera and the intra-image updated location is a first intra-image updated location, the method further comprising: obtaining a second updated intraoperative image with a second camera, the second camera having a different orientation, relative to the landmark, than the first camera; processing the second updated intraoperative image according to the feature descriptor to determine a second intra-image updated location of the landmark within the second updated intraoperative image; and processing the first intra-image updated location and the second intra-image updated location to determine an actual updated landmark position in a camera frame of reference;
  wherein the registration error is detected by: (i) employing a known coordinate transformation between a frame of reference of the tracking system and the camera frame of reference to represent the estimated updated position of the landmark and the actual updated landmark position in a common frame of reference; (ii) determining a spatial offset between the estimated updated position of the landmark and the actual updated landmark position; and (iii) determining that the spatial offset exceeds a threshold indicative of a loss of registration.

The actual updated landmark position may be determined for at least two additional landmarks, wherein that the method further comprises: processing the actual updated landmark positions to determine a registration correction suitable for correcting the registration error.

In some example implementations of the method, the initial landmark image region is identified according to input received from a user.

In some example implementations of the method, the initial landmark image region is automatically determined.

In another aspect, there is provided a method of generating a visible indication of registration accuracy during a medical procedure, the method comprising:
  employing a tracking system to detect an initial position and orientation of a trackable reference frame secured relative to a subject;
  employing a surface detection system to detect intraoperative surface data characterizing a surface region, the surface detection system having a known spatial relationship relative to the tracking system;
  at a subsequent time during the medical procedure:

employing the tracking system to detect an updated position and orientation of the trackable reference frame;

employing a camera to obtain an intraoperative image, the intraoperative image including at least a portion of the surface region, the camera having a known spatial relationship with one or both of the tracking system and the surface detection system;

transforming the intraoperative surface data according to a difference between the updated position and orientation of the trackable reference frame and the initial position and orientation of the trackable reference frame, thereby obtaining transformed intraoperative surface data that remains fixed relative to the trackable reference frame; and generating a surface annotation within the intraoperative image, the surface annotation being generated based on the transformed intraoperative surface data, thereby facilitating detection of registration error due to motion of the trackable reference frame relative to the subject via observation of an offset between surface features of the surface annotation and corresponding surface features visible in the intraoperative image.

In another aspect, there is provided a system of detecting registration inaccuracy during a medical procedure, said system comprising:

control and processing circuitry comprising at least one processor and associated memory, said memory comprising instructions executable by said at least one processor for performing operations comprising:

controlling a tracking system to detect an initial position and orientation of a trackable reference frame secured relative to a subject;

receiving, from a camera, an initial intraoperative image, the initial intraoperative image including a landmark, wherein the landmark is visible on the subject and is absent of fiducial markers trackable by the tracking system;

receiving landmark position information facilitating a determination of a corresponding initial position of the landmark relative to the trackable reference frame;

processing an initial landmark image region within the initial intraoperative image to generate a feature descriptor associated with the landmark, the initial landmark image region including at least a portion of the landmark; and subsequently controlling the tracking system to detect an updated position and orientation of the trackable reference frame;

processing the updated position and orientation of the trackable reference frame to determine an estimated updated position of the landmark such that the estimated updated position of the landmark remains fixed relative to the trackable reference frame;

receiving, from the camera, updated intraoperative image;

processing the updated intraoperative image according to the feature descriptor to determine an intra-image updated location of the landmark within the updated intraoperative image; and processing the estimated updated position of the landmark and the intra-image updated location of the landmark to detect a registration error due to motion of the trackable reference frame relative to the subject.

In some example implementations of the system, the control and processing circuitry is configured such that the registration error is detected by:

employing a known coordinate transformation between a frame of reference of the tracking system and a frame of reference of the camera to represent the estimated updated position of the landmark within the updated intraoperative image; determining a spatial offset within the updated intraoperative image between the estimated updated position of the landmark and the intra-image updated location of the landmark; and determining that the spatial offset exceeds a threshold indicative of a loss of registration.

In some example implementations of the system, the updated intraoperative image is a first updated intraoperative image obtained from a first camera and the intra-image updated location is a first intra-image updated location, and wherein the control and processing circuitry is further configured to perform operations comprising: receiving, from a second camera, a second updated intraoperative image, the second camera having a different orientation, relative to the landmark, than the first camera; processing the second updated intraoperative image according to the feature descriptor to determine a second intra-image updated location of the landmark within the second updated intraoperative image; and processing the first intra-image updated location and the second intra-image updated location to determine an actual updated landmark position in a camera frame of reference; wherein the registration error is detected by: (i) employing a known coordinate transformation between a frame of reference of the tracking system and the camera frame of reference to represent the estimated updated position of the landmark and the actual updated landmark position in a common frame of reference; (ii) determining a spatial offset between the estimated updated position of the landmark and the actual updated landmark position; and (iii) determining that the spatial offset exceeds a threshold indicative of a loss of registration.

The control and processing circuitry may be configured such that the actual updated landmark position is determined for at least two additional landmarks, the control and processing circuitry being further configured to perform operations comprising: processing the actual updated landmark positions to determine a registration correction suitable for correcting the registration error.

In some example implementations of the system, the control and processing circuitry is configured such that the initial landmark image region is identified according to input received from a user.

In some example implementations of the system, the control and processing circuitry is configured such that the initial landmark image region is automatically determined.

In another aspect, there is provided a system of generating a visible indication of registration accuracy during a medical procedure, said system comprising:

control and processing circuitry comprising at least one processor and associated memory, said memory comprising instructions executable by said at least one processor for performing operations comprising:

employing a tracking system to detect an initial position and orientation of a trackable reference frame secured relative to a subject;

employing a surface detection system to detect intraoperative surface data characterizing a surface region, the surface detection system having a known spatial relationship relative to the tracking system;

subsequently controlling the tracking system to detect an updated position and orientation of the trackable reference frame;

receiving, from a camera, an intraoperative image, the intraoperative image including at least a portion of the surface region, the camera having a known spatial relationship with one or both of the tracking system and the surface detection system;

transforming the intraoperative surface data according to a difference between the updated position and orientation of the trackable reference frame and the initial position and orientation of the trackable reference frame, thereby obtaining transformed intraoperative surface data that remains fixed relative to the trackable reference frame; and generating a surface annotation within the intraoperative image, the surface annotation being generated based on the transformed intraoperative surface data, thereby facilitating detection of registration error due to motion of the trackable reference frame relative to the subject via observation of an offset between surface features of the surface annotation and corresponding surface features visible in the intraoperative image.

A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which:

FIG. 9A shows the linear annotation pointing at a bone screw and FIG. 9B shows the linear annotation laterally offset from the bone screw due to motion of the trackable reference frame, thereby indicating a loss of registration.

FIG. 10A shows the linear annotation pointing at a bone screw, FIG. 10B shows the linear annotation laterally offset from the bone screw due to motion of the trackable reference frame, thereby indicating a loss of registration, and FIG. 10O shows the linear annotation again being directed at the bone screw after correction of the registration error.

DETAILED DESCRIPTION

Figure 1A:
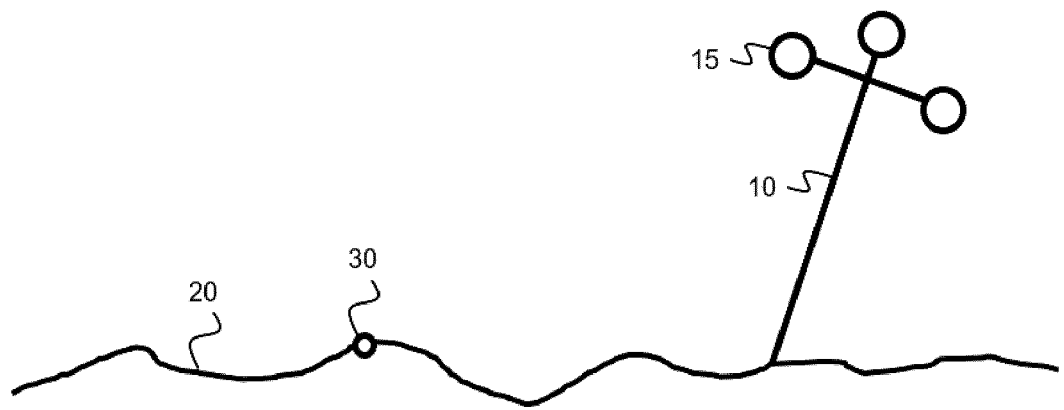
FIG. 1A illustrates a surgical field including a visible landmark residing on a subject and a trackable reference frame secured to the subject.

Various embodiments and aspects of the disclosure will be described with reference to details discussed below. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms "comprises" and "comprising" are to be construed as being inclusive and open ended, and not exclusive. Specifically, when used in the specification and claims, the terms "comprises" and "comprising" and variations thereof mean the specified features, steps or components are included. These terms are not to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. Unless otherwise specified, the terms "about" and "approximately" mean plus or minus 25 percent or less.

It is to be understood that unless otherwise specified, any specified range or group is as a shorthand way of referring to each and every member of a range or group individually, as well as each and every possible sub-range or sub-group encompassed therein and similarly with respect to any sub-ranges or sub-groups therein. Unless otherwise specified, the present disclosure relates to and explicitly incorporates each and every specific member and combination of sub-ranges or sub-groups.

As used herein, the term "on the order of", when used in conjunction with a quantity or parameter, refers to a range spanning approximately one tenth to ten times the stated quantity or parameter.

As used herein, the term "tracking system" refers to a system that allows the detection of the position and orientation of an object in three dimensions. An example of a tracking system is an optical tracking system operating with visual or infrared light that may employ stereo cameras to detect the positions of passive optical markers (e.g. reflective spheres) and/or active optical markers (e.g. light emitting diodes (LEDs)). Other non-limiting examples of tracking systems include electromagnetic tracking systems and surface imaging tracking systems.

Navigated surgical procedures often involve the use of a tracking system to facilitate the visual representation of the intraoperative position and orientation of tracked medical instruments relative to pre-operatively obtained volumetric image data. In many implementations of surgical navigation, a trackable reference frame (e.g. a trackable fiducial marker support structure) is secured relative to the subject in order to compensate for motion of the subject during the medical procedure.

For example, a trackable reference frame may be secured relative to the subject with a fixed position and orientation relative to the subject, such that changes in the position and/or orientation of the subject are reflected in changes in the position and/or orientation of the trackable reference frame. In some example implementations, the trackable reference frame may be attached directly to the subject. In other example implementations, the trackable reference frame may be indirectly secured to the subject via attachment to an intermediate device that is attached the subject. In other example implementations, both the subject and the trackable reference frame may be secured to an intermediate structure, such as a bed.

In such implementations, the trackable reference frame is provided such that its position and orientation is detectable by a tracking system. The trackable reference frame therefore includes one or more fiducial markers that are detectable by the tracking system. In one example case of an optical tracking system, three or more fiducial markers (either active or passive) may be supported on the trackable reference marker. In another example implementation, electromagnetic tracking sensors may be employed. In other example implementations, a glyph or a three-dimensional shape may be detectable by a tracking system or a surface-detection-based tracking system, respectively, to facilitate the detection of signals or images that facilitate the determination of the position and orientation of the trackable reference frame.

In order to maintain intraoperative registration between the intraoperative frame of reference of the subject and a frame of reference associated the volumetric image data, as facilitated by the tracking system, the trackable reference frame must maintain a fixed position and orientation relative to the subject. Unfortunately, the trackable reference frame is often susceptible to inadvertent contact during a medical procedure. Such contact can lead to shift in the position and/or orientation of the trackable reference frame, thus generating a registration error that can potentially have a significant negative impact on the medical procedure.

For this reason, there is often a need to intraoperatively verify registration during a medical procedure. For example, one method for intraoperatively verifying registration involves the contact of a tracked medical instrument (detectable by the tracking system) with an exposed anatomical feature (e.g. an anatomical bone feature) in order to verify that during contact, the navigation image shows the representation of the tracked medical instrument as contacting the correct anatomical location in the pre-operative image data. This process of registration verification can be time-consuming and costly, creating undue delay, risk and expense.

The present inventors thus sought an improved approach to intraoperative guidance that would facilitate the rapid and efficient intraoperative assessment of registration without the need to introduce an additional sterile tool into the surgical field during registration verification. The present inventors realized that an intraoperative image, obtained from a camera (e.g. a video camera), could be employed to facilitate this assessment by generating an annotation (an augmented feature) in the intraoperative image that indicates the expected position of a landmark on the subject, which can be visually compared with the actual location of the landmark in the camera image to obtain a visual measure of registration accuracy or quality.

Accordingly, in various example embodiments disclosed herein, systems and methods are provided that facilitate an intraoperative assessment of registration associated with a trackable reference frame based on displaying, in an intraoperative camera image, an annotation indicative of the expected location of a visible landmark on the subject. An initial position of the landmark is identified (various example methods of identifying this initial position are described below) and an initial position and orientation of the trackable reference frame is determined. The position and orientation of the trackable reference frame is subsequently tracked, and an estimated updated position of the landmark is determined based on the tracked position and orientation of the trackable reference frame by maintaining a fixed three-dimensional offset between the landmark and the trackable frame of reference. An annotation indicating the estimated updated position of the landmark is generated and displayed in an intraoperative image acquired by a camera having a known spatial relationship with the tracking system. A user observing the camera image may then visually observe presence of a registration error by observing a lack of spatial concordance, in the camera image, between the actual location of the landmark in the camera image and the estimated updated location as indicated by the annotation.

An example method of generating a visible indication of registration accuracy during a medical procedure henceforth described with reference to FIGS. 1A-1D and FIG. 2. FIG. 1A shows a trackable reference frame 10 having fiducial markers 15 attached thereto, attached to a subject. The surface of the subject is shown at 20. An intraoperatively visible landmark 30 is also shown residing on the subject. This landmark may be a non-anatomical landmark, such as an object that is secured to the subject (e.g. a specific location on such an object). Alternatively, the landmark may be an anatomical landmark that is intraoperatively visible as an anatomical feature on the subject.

An example of a non-anatomical landmark is a bone screw that is secured to the subject (or a specific feature on the bone screw, such as the screw head, the center of the screw head, or the location of the drive feature on the screw head). Alternative examples of non-anatomical landmarks include, but are not limited to, clamps which hold the landmark feature which are connectable to the patient anatomy or connect to a patient support device such as the bed frame or cranial stabilization frame and are secured in place relative to the patient anatomy. Additional examples of non-anatomical landmarks include markings on a patient drape (e.g. Ioban™), adhesive markers that may be applied to the patient skin or patient drape (e.g. Ioban™), markings applied to the patient anatomy or patient drape using a sterile or non-sterile marking device, and a landmark feature on a retractor system fixed to the patent.

Furthermore, features such as, but not limited to, divots, holes, crosshairs, and corners may be included on surgical implements such as clamps, screws, and adhesive backings to act as landmarks and/or facilitate identification of the initial position of a landmark. Such features may additionally or alternatively be included to enhance the detectability of differences between the estimated landmark position and the actual landmark position within the camera image. Additional non-limiting examples of such features include patterns, codes, colors, geometric features, which may be more easily identifiable in the camera images and which could also aid in the generation of feature descriptors for use in feature detection algorithms. In some example implementations, hyper-reflective, luminescent and/or fluorescent materials that will produce a local increase in reflection and/or glow under particular lighting conditions (e.g. room lights, head lights, surgical lights, light generated from a projection system, laser, or other external light source) may be employed to improve ease of viewing the landmark in the camera image(s) or directly in the surgical field. Examples of such materials include, but are not limited to, 3M™ Scotchlite™ reflective tape, 3M™ Luminous Film Series 6900, 3M™ Photoluminescent Film 100-199 Series, highly polished flat metal surfaces, highly polished spherical metal surfaces, a dome like structure composed of a plurality of highly polished flat metal surfaces. Use of non-visible light to designate areas that are responsive to light in that spectrum such that a visible change is obvious to the operator.

An example of an anatomical landmark is an anatomical bone feature that is intraoperatively visible on the subject, such as, for example, the superior or inferior tip of a spinous process, a natural divot within the bone surface, a divot created within the bone surface using a drill or other means, a burn mark created using cautery or other means, an osteophyte, and the tip of the left or right transverse process.

The landmark, whether anatomical or non-anatomical, does not include fiducial markers and is thus not detectable by the tracking system, unlike the trackable reference frame 10. However, since the landmark is intraoperatively exposed and visible, it is observable in a camera image (e.g. a video feed) acquired during the procedure.

In some example implementations, the trackable reference frame and landmark may be provided on the same rigidly connected anatomy (e.g. the same spinal level). In these situations, a discrepancy between the estimated position of the landmark and the actual landmark position is due to movement of the reference frame. In other example implementations, the trackable reference frame and landmark may reside on the same mechanical structure which is connected rigidly to the patient anatomy (e.g. a cranial stabilization frame). In such implementations, a discrepancy between the estimated position of the landmark and the actual landmark position is due to movement of the reference frame relative to the mechanical structure and/or motion of the patient relative to the mechanical structure (e.g. a patient's cranium slipping in the pins of a cranial stabilization frame). In other example implementations, the trackable reference frame and the landmark may be located on highly stable but not necessarily rigidly connected anatomy (e.g. different spinal levels). In such cases, a discrepancy between the estimated position of the landmark and the actual landmark position is due to movement of the reference frame and/or intervertebral motion. In other example implementations, the landmark may be connected to the patient anatomy (e.g. skin) and/or items attached securely to the patient (e.g. sterile drapes, retractors, etc.) which are stable but not necessarily fixed to where the reference frame is attached. In other example implementations, the landmark may be connected to a structure supporting (e.g. bed or bed rail) or in close proximity (e.g. a stand, tray, articulating arm) to the subject but not necessarily fixed to where the reference frame is attached.

Figure 2:
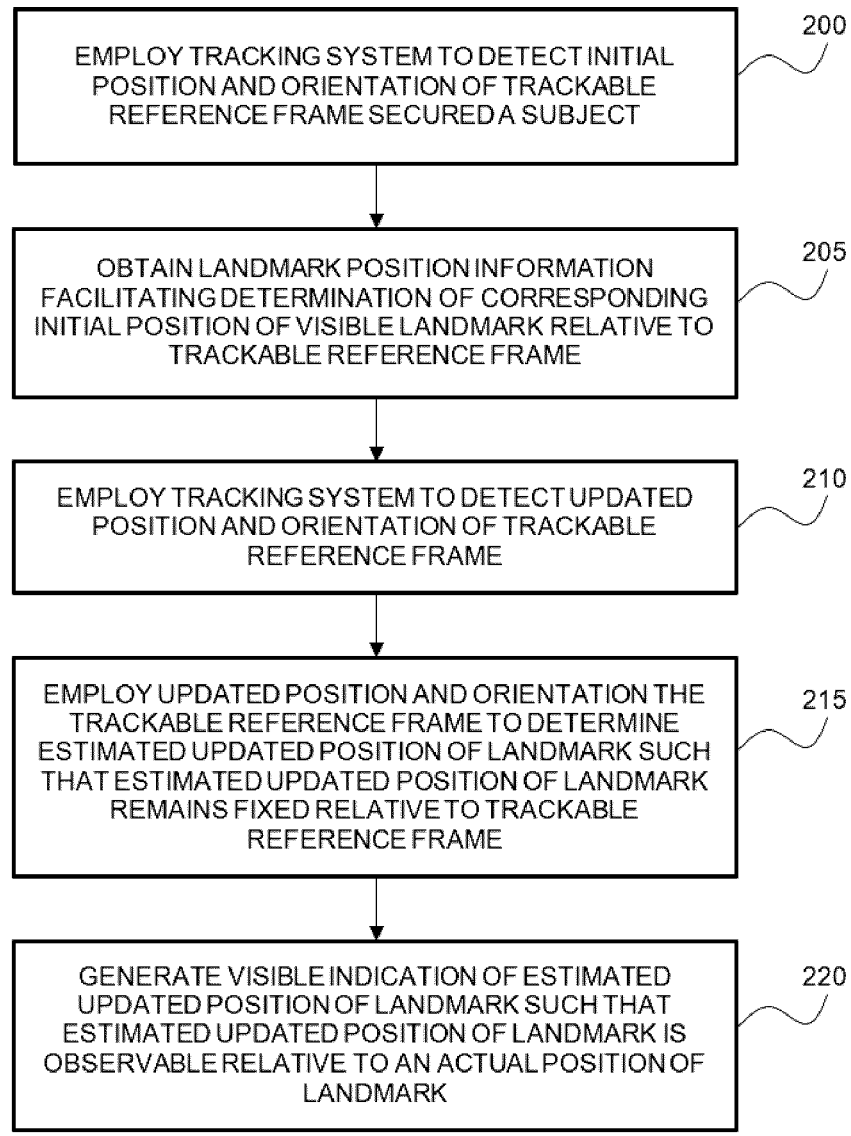
FIG. 2 is a flow chart illustrating an example method of generating a visible indication of registration accuracy during a medical procedure.

Referring now to FIG. 2, which provides a flow chart illustrating an example method for generating a visible indication of registration accuracy during a medical procedure, a tracking system is initially employed at step 200 to detect an initial position and orientation of the trackable reference frame 10, thereby providing the initial position and orientation of the trackable reference frame 10 in the frame of reference of the tracking system.

As shown at step 205 of FIG. 2, in addition to determining the initial position and orientation of the trackable reference frame 10, landmark position information is also obtained that facilitates a determination of the corresponding initial position of the landmark 30 relative to the trackable reference frame 10 (facilitating the determination of an initial three-dimensional offset of the landmark relative to the trackable reference frame).

Figure 1B:
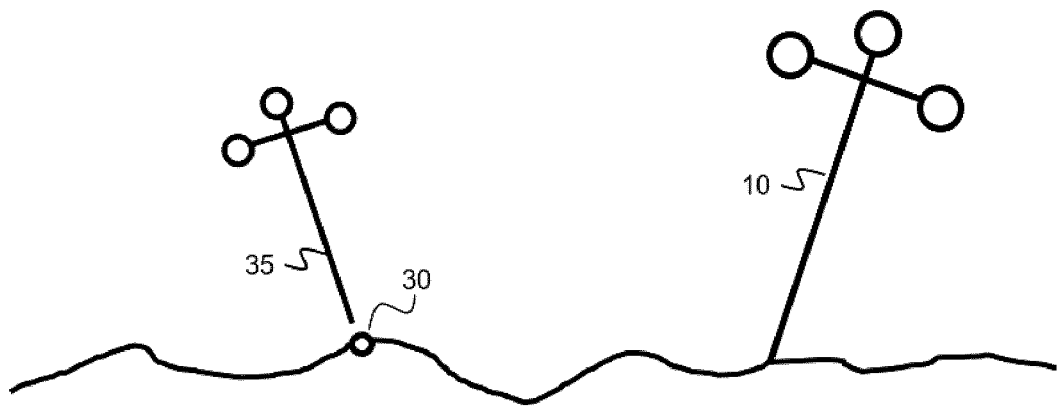
FIGS. 1B and 1C illustrate example methods of identifying an initial location of the landmark.
Figure 1C:
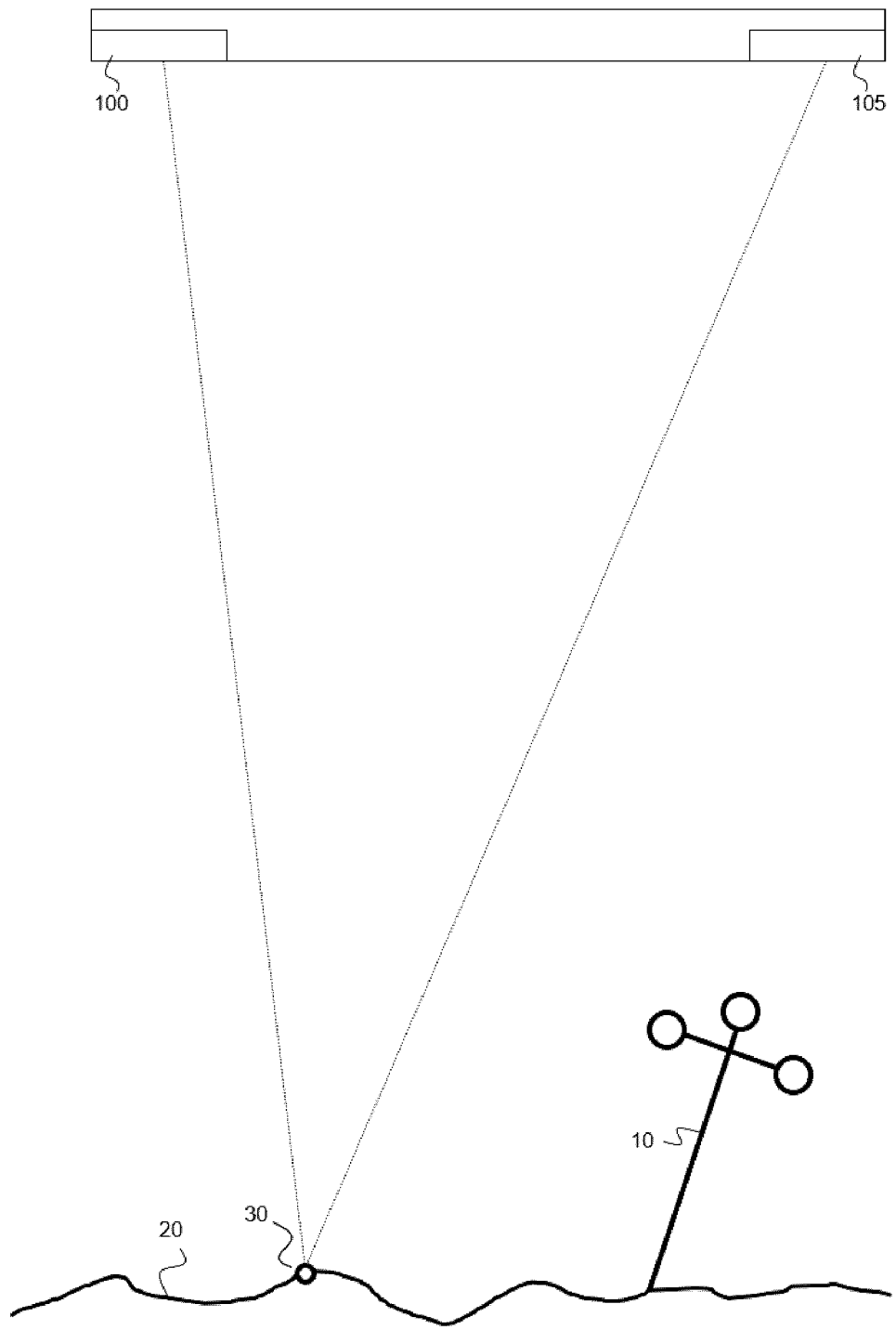

One example method for determining the landmark position information is illustrated in FIG. 1B. A trackable instrument 35 is employed to indicate the landmark 30 and the tracking system is employed to determine the initial position of the landmark 30 in the frame of reference of the tracking system. For example, in one example implementation, the trackable instrument 35 may be positioned such that its distal end contacts the landmark 30. In another example implementation, the trackable instrument 35 may be configured to facilitate identification of the location of the landmark 30 without contacting the landmark 30. For example, the trackable instrument 35 may include a light source that projects an optical beam from its distal end, along its longitudinal axis, and a distance sensor for determining a distance between the distal end of the trackable instrument 35 and the intersection of the optical beam with a surface. The position and orientation of the trackable instrument as determined by the tracking system, and the distance measured by the distance sensor, when the optical beam is directed at the landmark 30, may be processed to determine the position of the landmark 30 in the frame of reference of the tracking system, thereby facilitating the determination of the initial position of the landmark 30 relative to the initial position and orientation of the trackable reference frame 10.

Another example method for determining the landmark position information is based on input provided by a user viewing a pair of images on a user interface, the pair of images being obtained from cameras having different view angles of the landmark, and where the cameras have a known spatial relationship with the tracking system.

An example of such an implementation is shown in FIG. 10. A pair of cameras 100 and 105 have respective fields of view that include the landmark 30. The cameras 100 and 105 may be components of the tracking system employed to detect the trackable reference frame 10 or may be separate cameras that are either fixed relative to the tracking system or are trackable by the tracking system. Input is received from a user viewing a user interface presenting the images from the two cameras 100 and 105, the input identifying the location of the landmark 30 in both images. This yields a point in each camera image from which the disparity between the points in both images can then be calculated. This disparity along with the x and y pixel locations the landmark in each of the images can then be transformed into a three-dimensional spatial coordinate using a perspective transformation, which determines, in a frame of reference associated with the cameras 100 and 105, the initial position of the landmark 30.

Instead of receiving input from a user identifying the location of the landmark 30 in both images generated by the cameras 100 and 105, input may alternatively be provided by the user identifying the landmark in an image generated by only one camera. Feature detection may then be employed to locate the landmark in the image acquired from by the second camera. Input is received from a user viewing a user interface presenting an image from at least one camera which can then be used to derive a description of the desired feature based on the local image information around the selected image point (feature descriptor). This description of the feature, along with the spatial relationship between the two cameras, can then be used to find the corresponding location of the landmark in the other camera image using a feature detection algorithm.

Another example method for determining the landmark position information is based on the use of a pointing instrument that is positioned, by a user, to indicate the landmark, such that the pointing instrument is within the field of view of the cameras. Images from the cameras can then be processed to identify the landmark based on one or more known properties associated with the pointing instrument and to respective locations of the landmark within each camera image. These locations may then be processed, as explained above, to determine the three-dimensional position of the landmark within the frame of reference of the cameras.

The identified initial position of the landmark 30 in the frame of reference associated with the cameras, the detected initial position and orientation of the trackable reference frame 10, and a known coordinate transform between the frame of reference of the cameras and a frame of reference of the tracking system may be employed to determine the initial position of the landmark relative to the initial position and orientation of the trackable reference frame 10, that is, an initial three-dimensional offset of the landmark relative to the trackable reference frame. If the cameras are sub-components of the tracking system, the cameras and the tracking system inherently have a common frame of reference and a coordinate transform is not required.

Referring again to FIG. 2, after having determined the initial position and orientation of the trackable reference frame and the landmark positional information facilitating the determination of the corresponding initial position of the landmark relative to the trackable reference frame, the tracking system is subsequently employed to track the trackable reference frame and to determine, at a subsequent time during the medical procedure, an updated position and orientation of the trackable reference frame, as shown at step 210. The updated position and orientation of the trackable reference frame is then employed, as per step 215, to determine an estimated updated position of the landmark.

The estimated updated position of the landmark is determined such that the relative position between the estimated updated position of the landmark and the trackable reference frame is preserved. In other words, the estimated updated position of the landmark remains fixed relative to the trackable reference frame, i.e. the three-dimensional offset between the estimated updated position of the landmark and updated position and orientation of the trackable reference frame is the same as the initial three-dimensional offset of the landmark relative to the trackable reference frame.

Figure 1D:
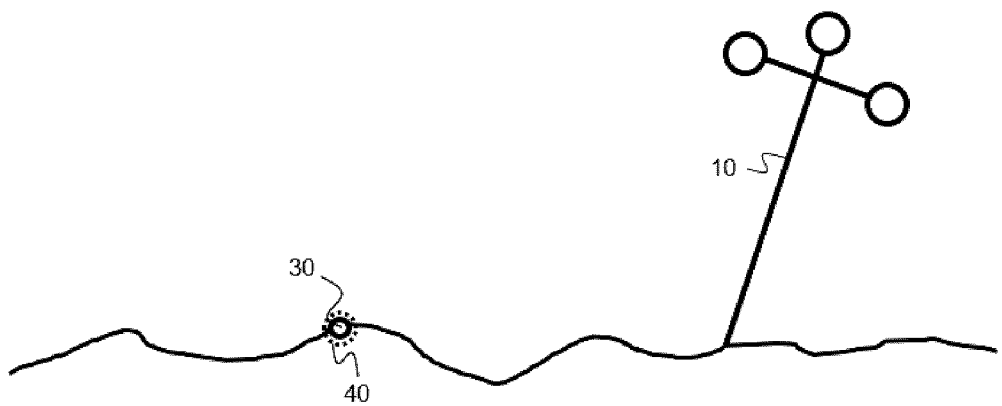
FIGS. 1D and 1E illustrate the determination of an estimated updated position of the landmark based on the detection of a change in the orientation of the trackable reference frame.
Figure 1E:
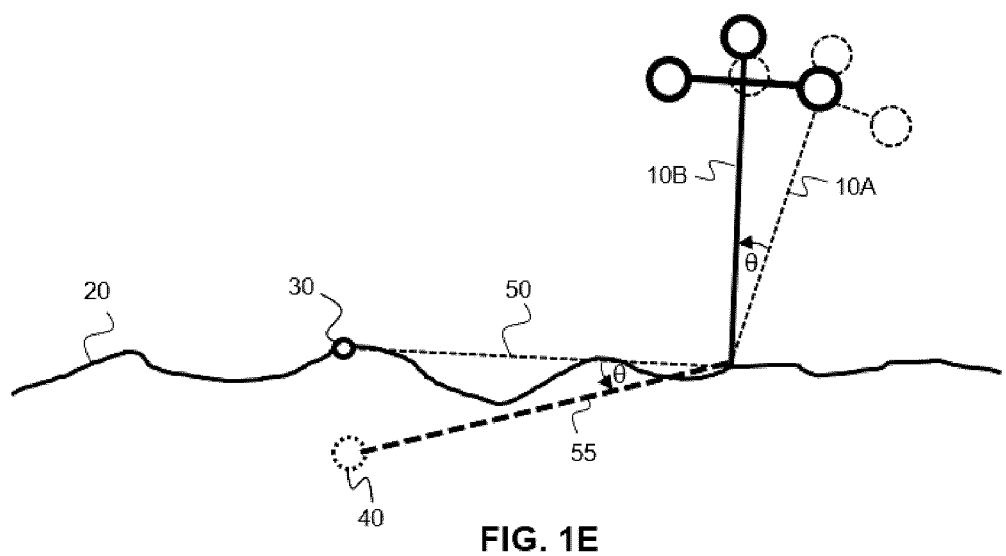

FIGS. 1D and 1E illustrate the determination of the estimated updated position of the landmark 30 based on initial position of the landmark and the change in the position and orientation of the trackable reference frame 10. FIG. 1D illustrates an example scenario in which the trackable reference frame 10 has maintained its position and orientation relative to the subject (e.g. contact with the trackable reference frame 10 has been avoided). Since the trackable reference frame 10 has not been moved, the estimated updated location of the landmark, shown in the example by the dashed circle 40, is aligned with the actual position of the landmark 30.

FIG. 1E illustrates a scenario in which the trackable reference frame 10 has been rotated, for example via inadvertent contact with a user, to a new orientation 10B that is detected by the tracking system, relative to an initial orientation 10A that was initially detected when determining the initial position of the landmark 30. The figure shows the three-dimensional estimated updated position 40 of the landmark, as determined by the system. The estimated updated position 40 of the landmark, which is determined, as noted above, by maintaining a fixed spatial relationship with the trackable reference frame, is rotated, relative to the base of the trackable reference frame, by the same angle θ as the rotation angle θ of the tracking reference frame, as can be seen via the rotation of segment 55 relative to segment 50 (the relative three-dimensional spatial offset between the estimated position of the landmark and the trackable reference frame is maintained). As a consequence, the estimated updated location 40 of the landmark now resides beneath the surface 20 of the subject.

As can be seen in the figure, the incorrect estimated updated location of the landmark is a direct consequence of the motion of the tracking reference frame 10 relative to the subject. As the registration of volumetric image data with the subject is predicated on an absence of motion of the tracking reference frame 10 relative to the subject, the spatial separation between the estimated updated location 40 of the landmark is indicative of a loss of registration.

Referring again to FIG. 2, after having determined the estimated updated location of the landmark, a visible indication is generated that indicates the estimated updated position of the landmark, such that the estimated updated position of the landmark is observable relative to the actual position of the landmark, as shown at step 220. The observed separation between the estimated position of the landmark and the actual position of the landmark facilitates a determination of inaccurate registration. Various example methods of generating the visible indication are henceforth described.

In some example embodiments, the visible indication is generated in as annotation within an image displayed on a display device providing a user interface, where the image is acquired by a camera having a known spatial relationship with the tracking system, and where the image includes the landmark. The observed separation between the estimated position of the landmark, as indicated by the annotation in the image, and the actual position of the landmark, as shown in the image, facilitates a determination of inaccurate registration.

Figure 1F:
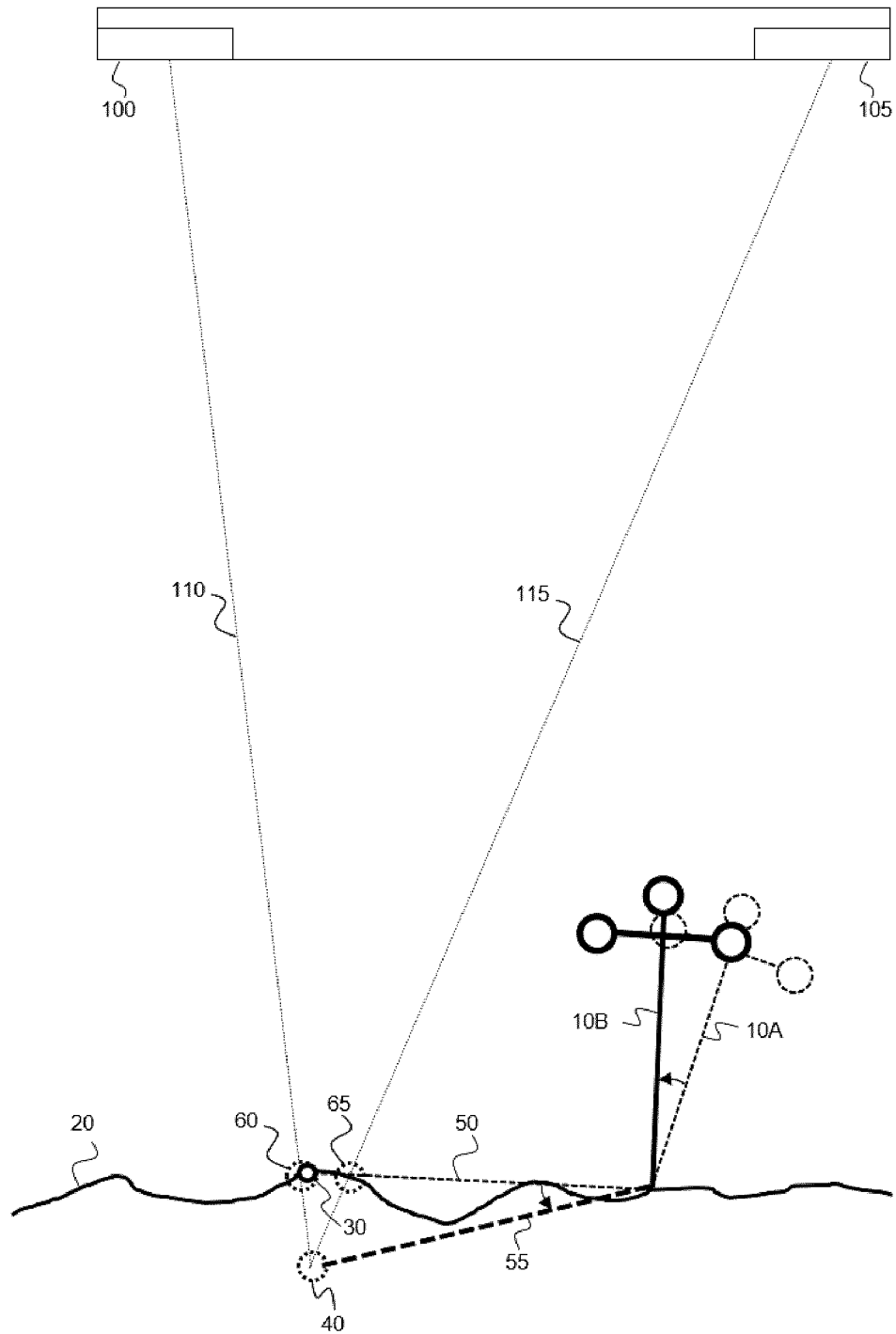
FIG. 1F illustrates the location of annotations generated in images obtained by camera 100 and 105 for indicating the estimated updated position of the landmark.

An example implementation of this embodiment is illustrated in FIG. 1F, based on the scenario previously illustrated in FIG. 1E in which the tracking reference frame has been rotated from an initial orientation 10A to a new orientation 10B. In the example implementation shown in FIG. 1F, two cameras 100 and 105 are employed to record intraoperative images that include the landmark (these cameras may have been previously employed to determine the initial position of the landmark, as previously described with reference to FIG. 10) and the images from these cameras are annotated to show the estimated updated position 40 of the landmark.

The cameras 100 and 105 may be components of the tracking system employed to detect the trackable reference frame 10 or may be separate cameras that are either fixed relative to the tracking system or are trackable by the tracking system, such that a known coordinate transformation exists between the frame of reference of the cameras and a frame of reference of the tracking system. Alternatively, spatial relationship between the cameras and the tracking system may be determined by having and object(s) within the field of view of the cameras and the tracking system, the object(s) being tracked by both the cameras and the tracking system. Three or more points on the object(s), identifiable in both coordinate systems, may be sufficient to generate a coordinate transformation, for example, by using a landmark transform algorithm.

Accordingly, the estimated updated position 40 of the landmark, when initially determined in the frame of reference of the tracking system, may be represented in the frame of reference of the cameras 100 and 105 using a known coordinate transformation between the reference frame of the cameras and the reference frame of the tracking system. Intraoperative images acquired by the cameras 100 and 105 may then be annotated with respective augmented reality annotations that indicate, within the image, the estimated updated location 40 of the landmark. The camera calibration data is used to generate perspective transforms to map the landmark position in 3D physical space onto each camera's 2D image space as a x-y pixel location. The step of generating the perspective transforms can practically be accomplished by using the commonly used computer vision SDK OpenCV. In place of the landmark position in the camera's 3D coordinate system, an arbitrary annotation object can be placed, which is then re-projected to the camera's 2D image using the perspective transform above, augmenting the camera's image. Examples of an annotation object include a sphere, a crosshair, a line, a cone, a stylus, a 2D image, a gif (animation) or any combinations of the above.

In some example implementations, the annotation can be superimposed to the user via a head-mounted display such as a heads-up display headset or a virtual reality headset. In the case of a heads-up display, which does not require cameras, the user views the annotations while also viewing the real space, perceiving the annotations as being superimposed onto the real space view. Accordingly, the rays 110 and 115 in FIG. 1F may be understood as being directed to the user's eyes, rather than to cameras 100 and 105 that are absent in such an implementation. The spatial relationship between the tracking system and the heads-up display frame of reference (associated with the user's eyes) may be determined by directly tracking the user's head, or via the tracking of fiducials located on the headset.

Alternatively, the spatial relationship between the tracking system and the user's head can be determined by placing sensors on the headset such that the sensors detect 3 or more points within their field of view which are also detectable by the tracking system. Sensors could include, but are not limited to, cameras, ultrasonic sensors, photodetectors, lidar or time of flight sensors.

Alternatively the tracking system may be directly attached to the user's head with a known spatial relationship between tracking system and the heads-up display frame of reference.

In the case of a virtual reality headset, in which the user views stereoscopic images displayed by the headset rather than a real space view, and the images may be recorded with cameras that are remote from the headset itself, with the headset facilitating the user with the perception of depth when viewing the images. Alternatively, the cameras may be mounted directly to the headset to enable viewing of the surgical field from the view point of the user, thus enabling the user to more easily interact with the surgical field. The spatial relationship between the cameras and the tracking system can once again be determined by using the methods described above. It is noted that the FIG. 1F shows the three-dimensional estimated updated position of the landmark, as determined by the system. This figure does not directly illustrate what a user would observe when viewing an annotated camera image of the surgical field. Instead, FIG. 1F illustrates how the camera angle affects the region within the image that the annotation resides relative to the imaged surface, and in particular, the imaged landmark. Specifically, FIG. 1F shows rays 110 and 115 extending between the three-dimensional location of the estimated updated position 40 of the landmark and the cameras 100 and 105, respectively. The intersections of these rays with the surface 20 of the subject shows the perceived estimated updated location 60 and 65 of the landmark relative to the imaged surface of the subject in the images that are displayed from the two cameras, respectively, as per annotations generated based on the estimated updated position 40 of the landmark.

As can be seen in the figure, the perceived (as projected) estimated updated position 60 of the landmark in the image acquired from camera 100, as indicated by an annotation generated based on the estimated updated position 40, will be very close to the actual location of the landmark 30 in the image. The small lateral offset of the perceived estimated updated location 60 in the image from the actual location 30 of the landmark in the image is due to the near-overhead positioning of the camera 100.

However, due to the lateral spatial offset of the other camera 105 from the landmark 30, the perceived estimated updated location 65 of the updated estimated position of the landmark in the image acquired from camera 105 is displayed with a significant lateral offset relative to the actual location of the landmark 30 in the image. Accordingly, a user viewing the annotated images would readily discern a lateral offset between perceived estimated updated location 65 of the annotation in the image acquired from camera 105, enabling the determination of a loss of registration due to motion of the trackable reference frame 10 relative to the subject.

It is noted that since the landmark 30 resides on the subject, global motion of the subject (and the landmark) does not cause a change in the displayed estimated updated location of the landmark relative to the actual location of the landmark. Such changes only result from a relative change in position and/or orientation between the trackable reference frame 10 and the landmark 30.

Figure 3A:
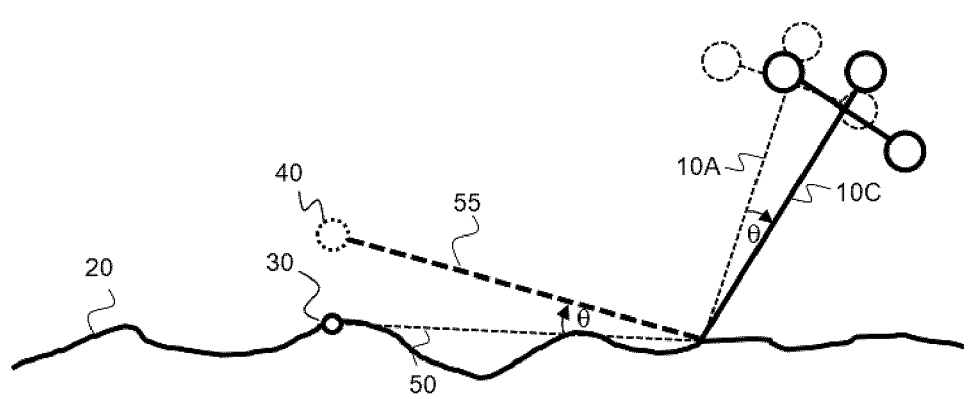
FIGS. 3A and 3B illustrate the determination of an estimated updated position of the landmark, and the display of an associated annotation, based on the detection of a change in the orientation of the trackable reference frame, where the direction of the change in the orientation of the trackable reference frame is opposite to that from FIG. 1E.
Figure 3B:
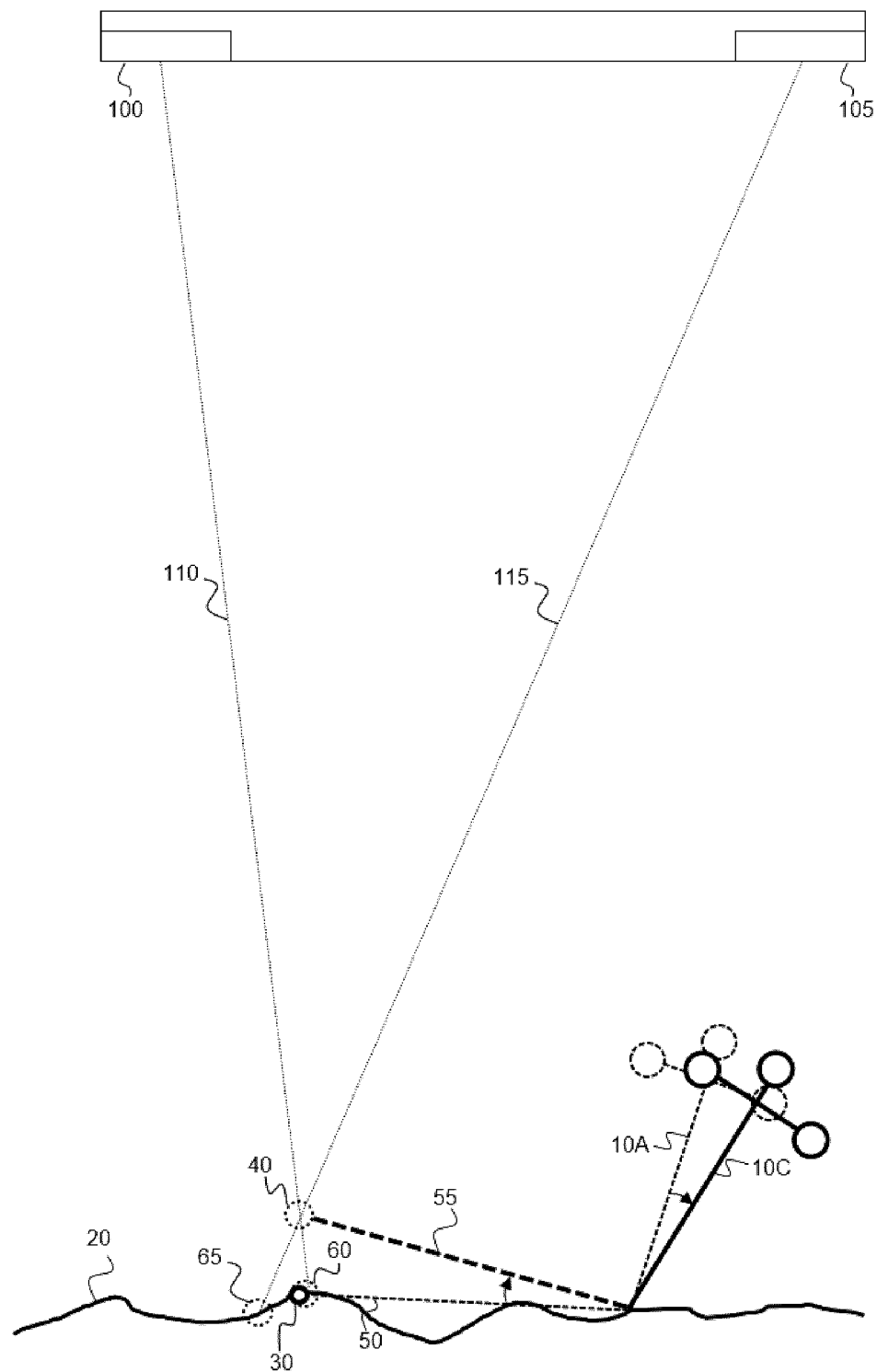

FIGS. 3A and 3B illustrate a scenario involving a rotation of the trackable reference frame in an opposite direction to that shown in FIGS. 1E and 1F. FIG. 3A illustrates a scenario in which the trackable reference frame 10 has been rotated, for example via inadvertent contact with a user, to a new orientation 10C that is detected by the tracking system, relative to an initial orientation 10A that was initially detected when determining the initial position of the landmark 30. The figure shows the three-dimensional estimated updated position 40 of the landmark, as determined by the system. The estimated updated position 40 of the landmark, which is determined, as noted above, by maintaining a fixed spatial relationship with the trackable reference frame, is rotated, relative to the base of the trackable reference frame, by the same angle θ as the rotation angle θ of the tracking reference frame, as can be seen via the rotation of segment 55 relative to segment 50 (the relative three-dimensional spatial offset between the estimated position of the landmark and the trackable reference frame is maintained). As a consequence, the estimated updated location 40 of the landmark now resides above the surface 20 of the subject.

FIG. 3B illustrates the perceived estimated updated locations 60 and 65 of the landmark in images acquired by cameras 100 and 105, based on the scenario previously illustrated in FIG. 1E in which the tracking reference frame has been rotated from an initial orientation 10A to a new orientation 10C. The figure shows rays 110 and 115 extending between the three-dimensional location of the estimated updated position 40 of the landmark and the cameras 100 and 105, respectively. The intersections of these rays with the surface 20 of the subject shows the perceived estimated updated location 60 and 65 of the landmark relative to the imaged surface of the subject in the images that are displayed from the two cameras, respectively, as per annotations generated based on the estimated updated position 40 of the landmark.

As can be seen in the figure, as in FIG. 1F, the perceived estimated updated position 60 of the landmark in the image acquired from camera 100, as indicated by an annotation generated based on the estimated updated position 40, will be very close to the actual location of the landmark 30 in the image. The small lateral offset of the perceived estimated updated location 60 in the image from the actual location 30 of the landmark in the image is due to the near-overhead positioning of the camera 100.

However, due to the lateral spatial offset of the other camera 105 from the landmark 30, the perceived estimated updated location 65 of the updated estimated position of the landmark in the image acquired from camera 105 is displayed with a significant lateral offset relative to the actual location of the landmark 30 in the image (in the opposite direction from that shown in FIG. 1F). Accordingly, a user viewing the annotated images would readily discern a lateral offset between perceived estimated updated location 65 of the annotation in the image acquired from camera 105, enabling the determination of a loss of registration due to motion of the trackable reference frame 10 relative to the subject.

As can be seen comparing FIGS. 1F and 3B, the directional offset of the perceived estimated location of the landmark in the images facilitates a determination of the direction of rotation of the trackable reference frame from its desired orientation. Furthermore, both FIGS. 1F and 3B show the benefit of employing more than a single camera, with each camera having a different view angle. Indeed, if one of the cameras is oriented in an orientation that results in a small observed offset of the perceived estimated updated location of the landmark relative to the actual location of the landmark (e.g. camera 100 in FIGS. 1F and 3B), a larger offset of the perceived estimated updated location of the landmark relative to the actual location of the landmark will be observed in the image from another camera (e.g. camera 105 in FIGS. 1F and 3B).

FIGS. 1F and 3B also illustrate how a larger angular separation between the view angles of the cameras can be beneficial in generating a larger observed offset in the separation between the perceived estimated updated location of the landmark relative to the actual location of the landmark. Accordingly, in some example implementations, the angular separation between the view angles of at least two cameras is at least 30 degrees, at least 40 degrees, at least 50 degrees, at least 60 degrees, at least 70 degrees, at least 80 degrees, or at least 90 degrees.

It can also be seen from FIGS. 1E and 3A that the change in the three-dimensional spatial offset between the estimated updated position 40 of the landmark and the actual position of the landmark 30, for rotations of the trackable reference frame 10, is dependent on the spatial separation between the trackable reference frame 10 and the landmark 30. Accordingly, in some example implementations, the landmark is selected such that the spatial offset between the landmark 30 and the trackable reference frame 10 is at least 5 cm, at least 10 cm, at least 15 cm, at least 20 cm, at least 25 cm, at least 30 cm, or at least 35 cm.

It will be understood that the annotation that is generated and displayed in the camera images may take on a wide variety of forms while providing an indication of the estimated updated location of the landmark. In some example implementations, the annotation may spatially overlap with the estimated updated location of the landmark, such as a circle, square of star indicating the estimated updated location of the landmark. In other example implementations, the annotation may provide an indication of the estimated updated location of the landmark without spatially overlapping with the estimated updated location of the landmark. Examples of such annotations include a circle or other shape that at least partially surrounds the estimated updated location of the landmark (e.g. a dashed circle). Other examples of such annotations include a crosshair that is open at its center.

In some example implementations, the annotation may, at least in part, be based on a computed virtual elongate object, such as a virtual linear segment, that spatially extends from the estimated updated location of the landmark, or from a location adjacent to the estimated updated location of the landmark (e.g. within 5 mm, 2 mm or 1 mm from the estimated updated location of the landmark).

Figure 4A:
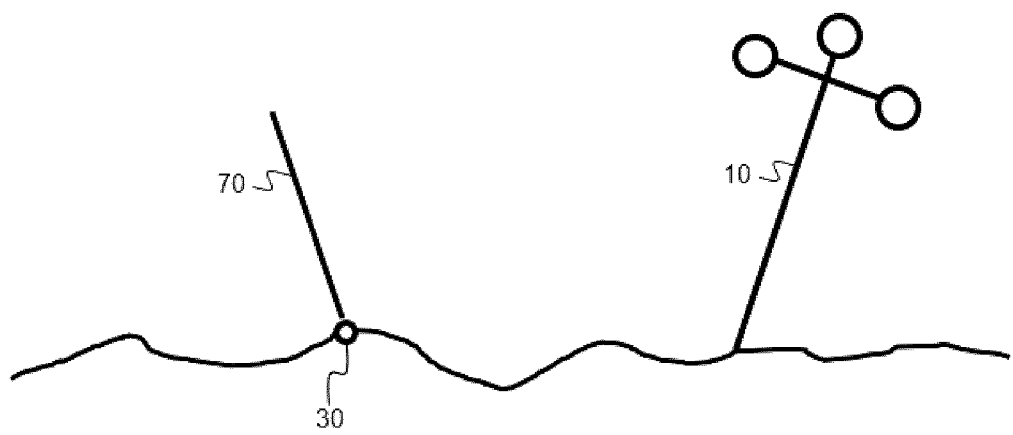
FIGS. 4A-4D illustrate the determination of an estimated updated position of a virtual linear segment associated with the position of the landmark, and the display of an associated annotation, based on the detection of a change in the orientation of the trackable reference frame.
Figure 4B:
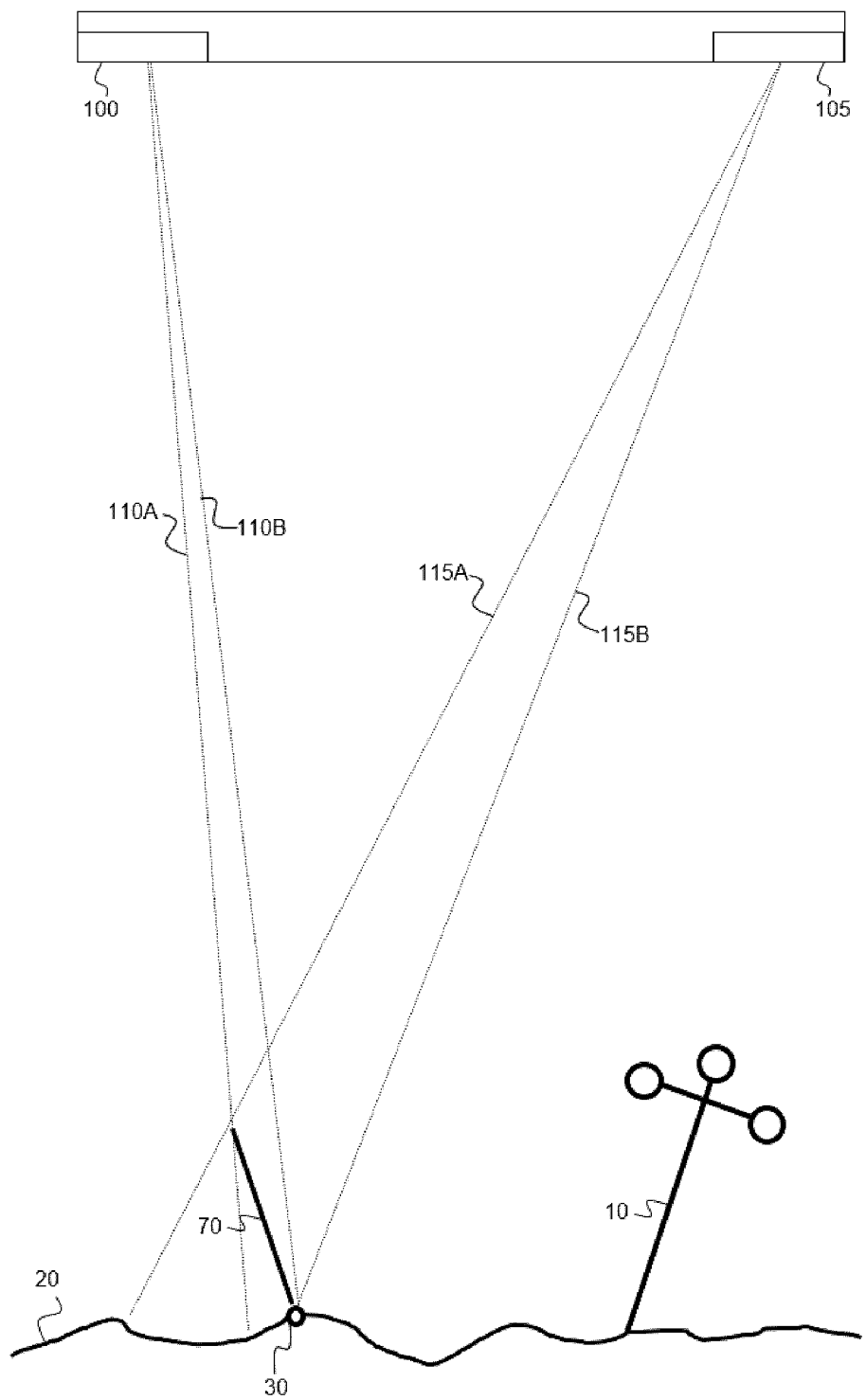

An example of such an implementation is shown in FIG. 4A, which shows the spatial location, in three-dimensions, that corresponds to a virtual linear segment having a defined initial orientation relative to the landmark 30. As shown in FIG. 4B, if the position of the trackable reference marker does not vary, then the calculated position and orientation of the virtual linear segment 70 does not change. As such, an annotation generated in an image acquired by camera 100 will extend from the intersection of the ray 110A with surface 20 to the intersection of the ray 110B with the surface 20 (extending to the left of the landmark 30). Likewise, an annotation generated in an image acquired by camera 105 will extend from the intersection of the ray 115A with surface 20 to the intersection of the ray 115B with the surface 20 (also extending to the left of the landmark 30, but by a greater amount than the annotation in the image from the camera 100).

Figure 4C:
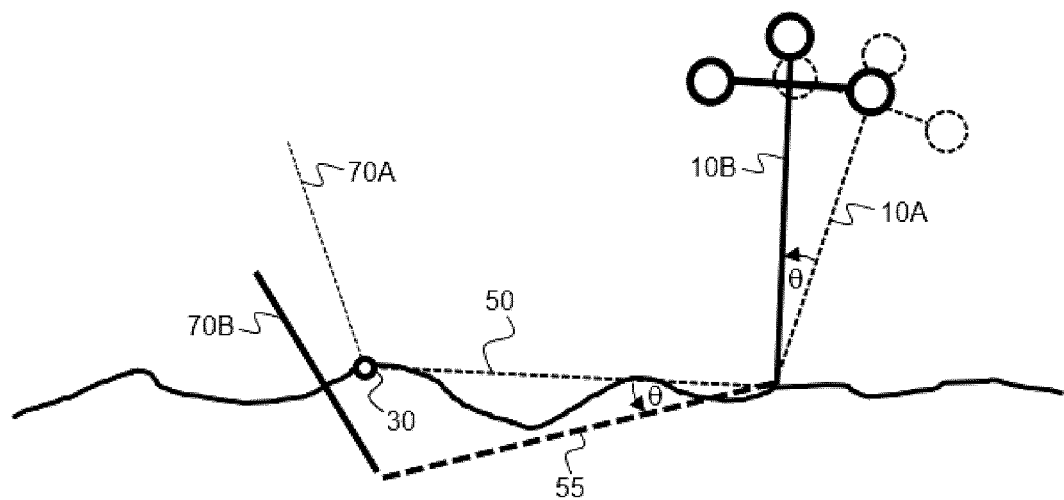
Figure 4D:
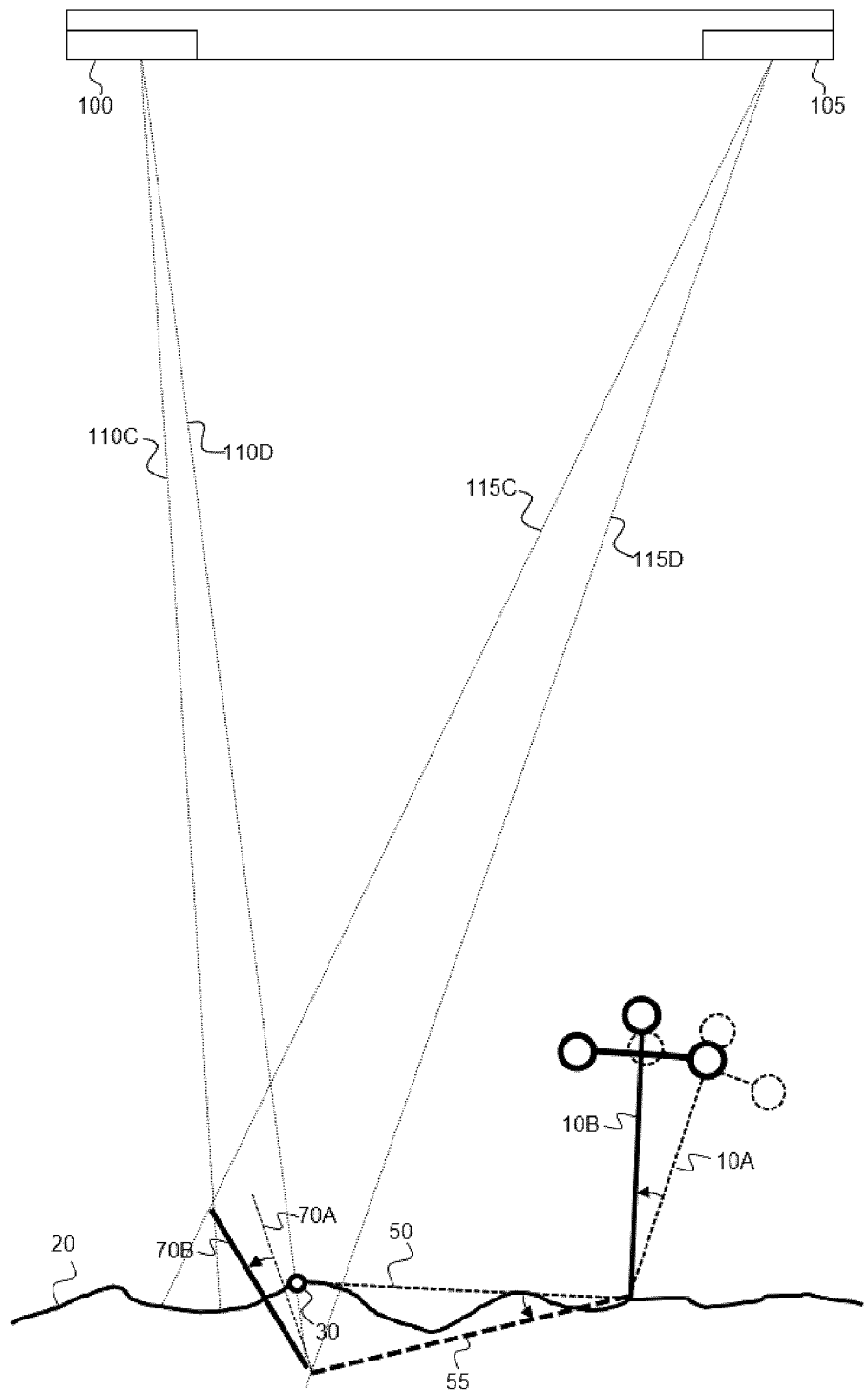

If, however, the trackable reference frame 10 is disturbed and is rotated by an angle θ, the virtual linear segment is shifted and rotated. This is shown in FIG. 4C, in which the computed position and orientation of the virtual linear segment is shifted and rotated from the initial position and orientation 70A to the updated position and orientation 70B. As shown in FIG. 4D, an annotation generated in an image acquired by camera 100 will now extend from the intersection of the ray 110C with surface 20 to the intersection of the ray 110D with the surface 20 (extending to the left of the landmark 30). When compared to FIG. 4B, it is clear that the annotation in the image acquired from camera 100, as perceived relative to the surface 20 in the image, will extend further, to the left, from the landmark 30, with this extension indicating a loss of registration.

However, a more significant change is observable in the annotation generated in the image acquired by camera 105. As can be seen in FIG. 4D, this annotation will now extend from the intersection of the ray 115C with surface 20 to the intersection of the ray 115D with the surface 20 (also extending to the left of the landmark 30). This annotation is significant longer than the initial annotation and will now extend from the right side of the landmark to the left side of the landmark and will no longer "point" at the landmark. Accordingly, as in FIG. 1F, the annotation shown in the image from camera 105 will show a more pronounced indication of a loss of registration than the annotation in the image acquired by camera 100.

Figure 5A:
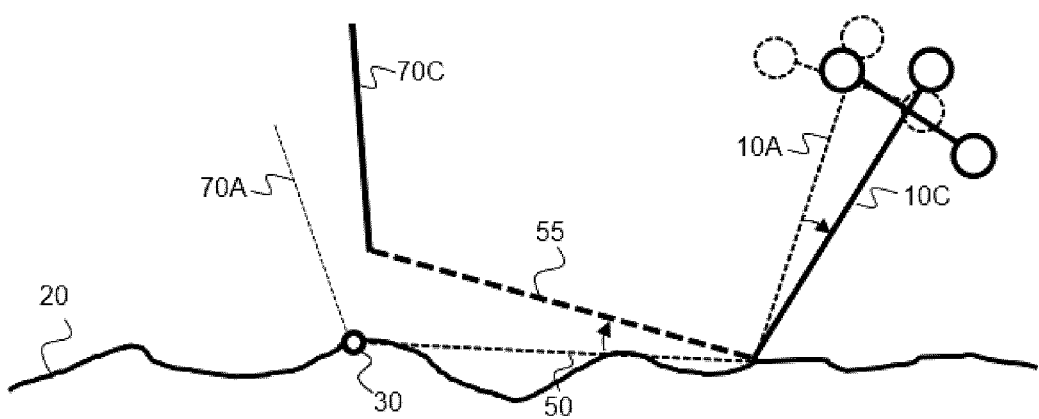
FIGS. 5A and 5B illustrate the determination of an estimated updated position of a virtual linear segment associated with the position of the landmark, and the display of an associated annotation, based on the detection of a change in the orientation of the trackable reference frame, where the direction of the change in the orientation of the trackable reference frame is opposite to that from FIGS. 4C and 4D.
Figure 5B:
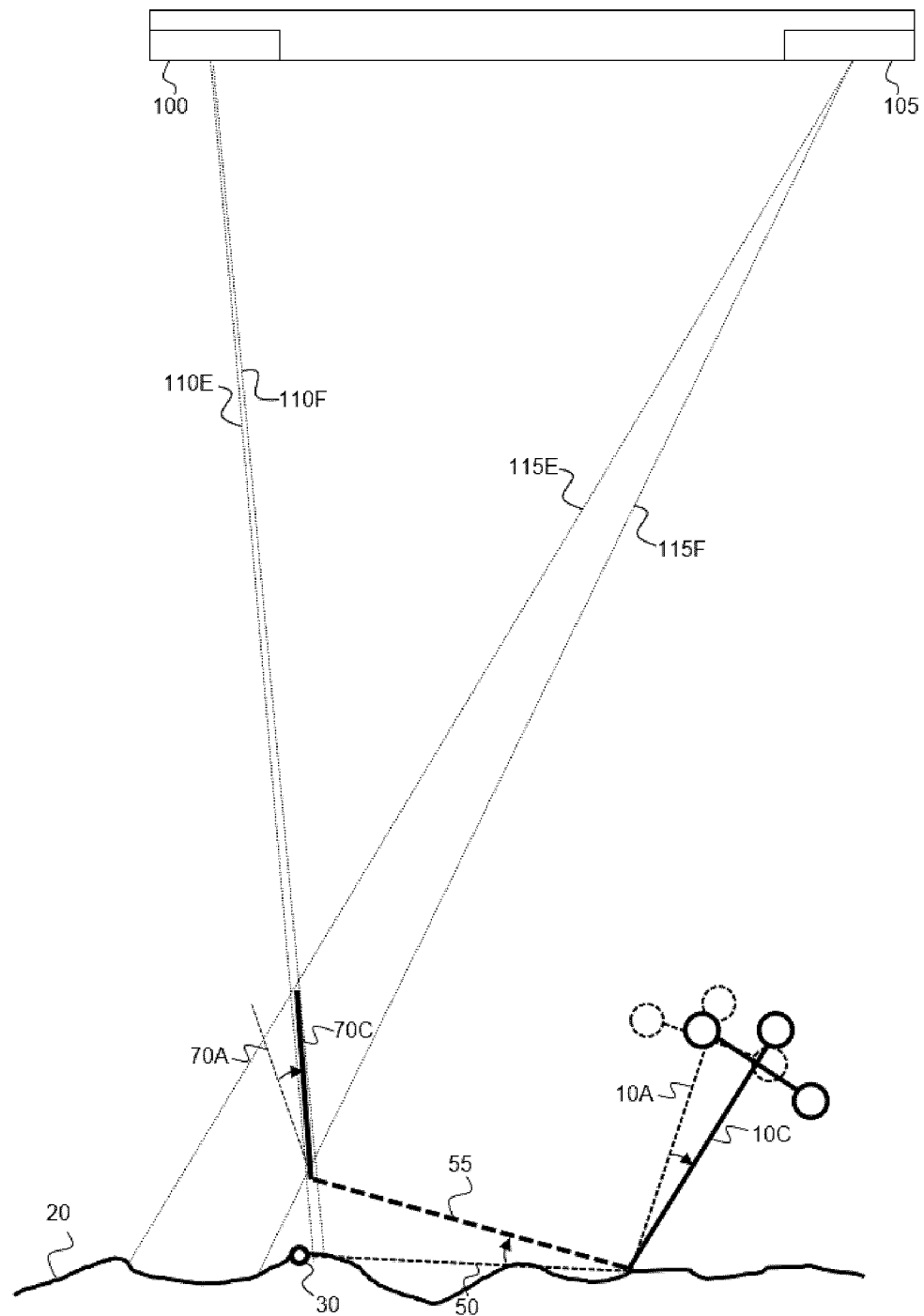

FIGS. 5A and 5B illustrate a scenario involving a rotation of the trackable reference frame in an opposite direction to that shown in FIGS. 4C and 4D. FIG. 5A illustrates a scenario in which the trackable reference frame 10 has been rotated, for example via inadvertent contact with a user, to a new orientation 10C that is detected by the tracking system, relative to an initial orientation 10A that was initially detected when determining the initial position of the landmark 30. Both FIG. 5A and FIG. 5B show the virtual linear segment shifting from an initial position and orientation 70A to an updated position and orientation 70C residing above the surface 20 of the subject.

FIG. 5B illustrates the perceived estimated updated locations 60 and 65 of the landmark in images acquired by cameras 100 and 105, based on the scenario previously illustrated in FIG. 5A in which the tracking reference frame has been rotated from an initial orientation 10A to the new orientation 10C. An annotation generated in an image acquired by camera 100 will now extend from the intersection of the ray 110E with surface 20 to the intersection of the ray 110F with the surface 20. When compared to FIG. 4B, it is clear that the annotation in the image acquired from camera 100 will have reduced from a segment to nearly a point that resides to the right of the landmark 30, indicating a loss of registration. Unlike the example illustrated in FIG. 3B, in which the annotation local to the estimated updated location of the landmark did not result in a large perceived offset in the image from the camera 100, the perceived length of the linear segment annotation for this camera, as illustrated in FIG. 5B, shows a high sensitivity to misalignment of the trackable reference frame.

A change is also observable in the annotation generated in the image acquired by camera 105. As can be seen in FIG. 4D, this annotation will now extend from the intersection of the ray 115E with surface 20 to the intersection of the ray 115F with the surface 20 (also extending to the left of the landmark 30). This will be annotation will be shorter than the initial annotation and will no longer "point" directly at the landmark due to a spatial offset between the landmark 30 and the point of intersection of the ray 115F with the surface 20.

In some example implementations, the initial position and orientation of an elongate virtual object (e.g. a virtual linear segment) may be generated based on the initial position and orientation of a trackable tool employed to identify the position of the landmark. For example, the initial position and orientation of the virtual linear segment 70 shown in FIG. 4A is computed based on the initially detected position and orientation of the trackable instrument 35 shown in FIG. 1B.

In some example implementations, the initial position and orientation of a virtual linear segment may be computed according to a prescribed orientation and spatial extent relative to the initial position of the landmark. The prescribed orientation may be defined, for example, with reference to principal axes of a coordinate system associated with the tracking system, or for example, relative to the initial orientation of the trackable reference frame 10. It will be understood that in some example embodiments, more than one linear annotation may be generated (based on the computed positions and orientations of multiple virtual linear segments).

In some example embodiments, the elongate virtual object (e.g. a virtual linear segment) may have an initial orientation that is determined based on a known orientation of a given camera, for example, in order to generate, in the event of rotation of the trackable reference marker, a suitably large perceived change in the position and/or spatial extent of the annotation that is generated.

In some example embodiments the initial orientation of the elongate virtual object may be generated such that the elongate virtual object is oriented such that an elongate axis associated with the elongate virtual object is approximately parallel to an optical axis associated with the camera sensor (e.g. within $\pm 25°$, $\pm 20°$, $\pm 15°$, $\pm 10°$, $\pm 5°$ or $\pm 2°$). In the case in which the elongate axis associated with the elongate virtual object is parallel to the optical axis associated with the camera sensor, a linear segment annotation associated with the elongate virtual object will appear as a "dot" when viewed in the camera image. Movement of the reference frame 10 has the visible effect of elongating the geometry of the annotation from a "dot" into a line within the camera image, making identification of this movement easily apparent to the user. The direction of extension of the dot into a line may also be beneficial in providing an indication of a direction in which the reference frame 10 was perturbed.

It will also be understood that movement of the camera relative to the landmark also changes the apparent orientation of the virtual elongate object relative to the landmark within the camera image. In some embodiments it may be advantageous for the user to reset the orientation of the virtual elongate object based on a new position of the camera when the camera is moved from one location/orientation to another location/orientation. The reset of the orientation may be initiated manually or alternatively the reset could be triggered automatically based on movement sensors associated with the camera.

It will be understood that in some example embodiments where more than one camera is employed to display an annotation indicative of the estimated updated position of the landmark, the virtual elongate object employed to generate a virtual annotation in one camera may have a different initial orientation than the virtual elongate object employed to generate a virtual annotation in another camera.

While many of the preceding example implementations involve the use of two cameras for generating and displaying annotated images, it will be understood that in other example implementations, a single camera may be employed to acquire and annotate an image. The camera may either be rigidly secured to the tracking system (e.g. the camera may be a component of the tracking system) or the camera may be trackable by the tracking system.

Figure 6A:
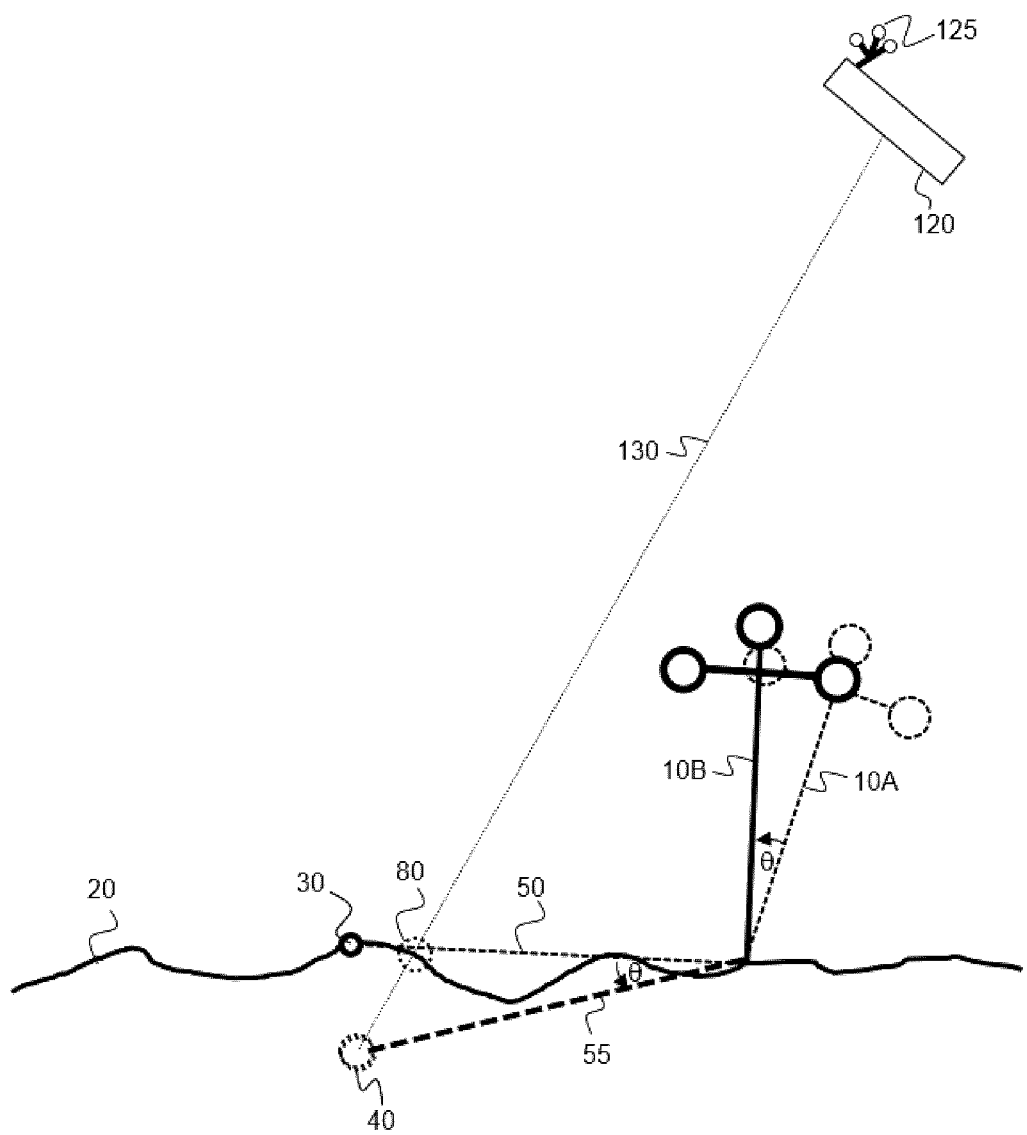
FIGS. 6A-6C illustrate the determination of an estimated updated position of the landmark, and the display of an associated annotation, based on the detection of a change in the orientation of the trackable reference frame, in an image from a single camera.

FIG. 6A illustrates an example implementation involving a tracked camera 120. The camera is shown having fiducial markers 125, and signals associated with the fiducial markers 125 are detectable by the tracking system. The scenario shown in FIG. 6A is based on the scenario previously illustrated in FIG. 1E in which the tracking reference frame has been rotated from an initial orientation 10A to a new orientation 10B. The camera 120 is employed to record intraoperative images that include the landmark and the images from this camera is annotated to show the estimated updated position 40 of the landmark. Ray 130 extends between the three-dimensional location of the estimated updated position 40 of the landmark and the camera 120. The intersection of this ray 130 with the surface 20 of the subject shows the perceived estimated updated location 80 of the landmark relative to the imaged surface of the subject in the image that is displayed from the camera, as per an annotations generated based on the estimated updated position 40 of the landmark, resulting in an observable spatial offset indicative of a loss of registration.

Figure 6B:
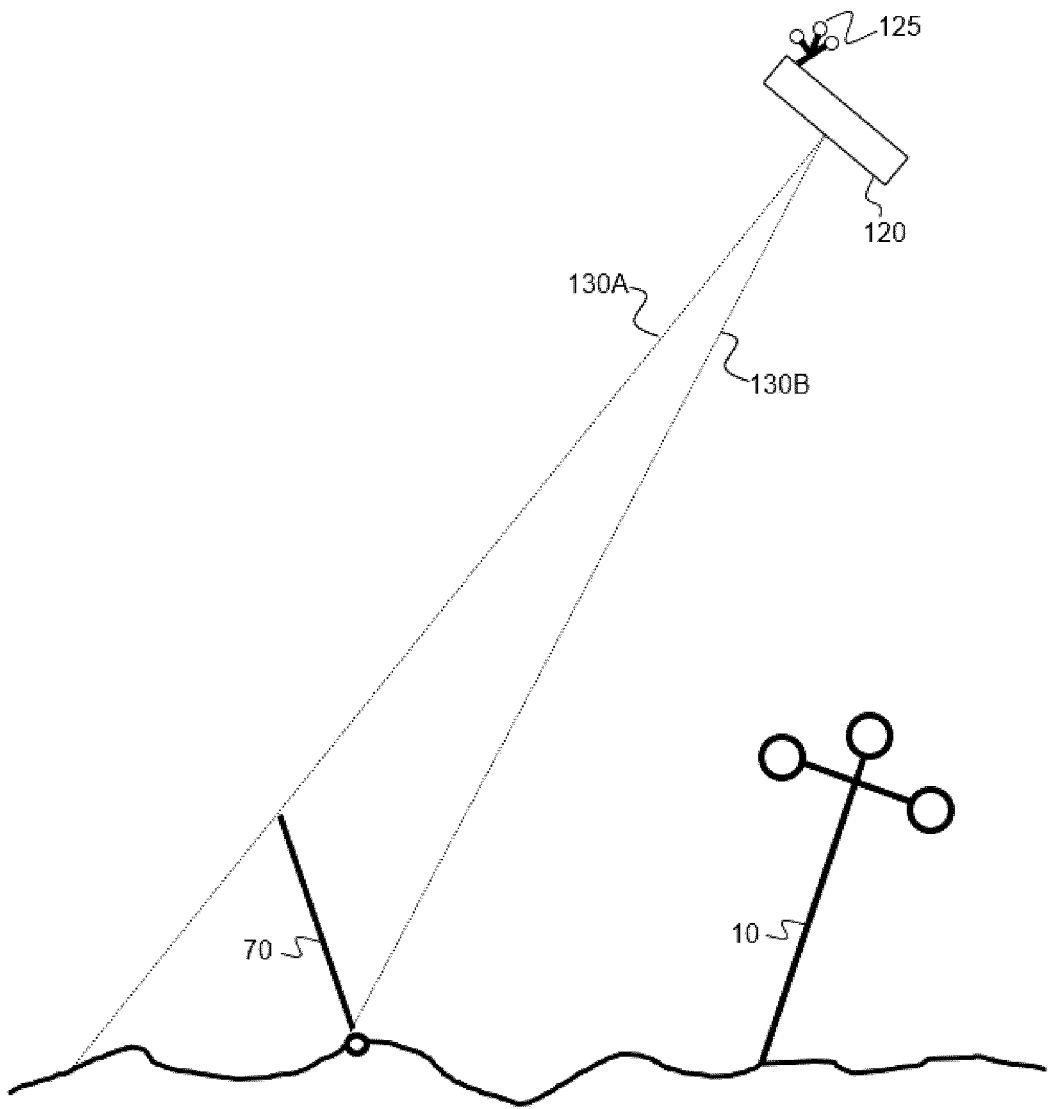
Figure 6C:
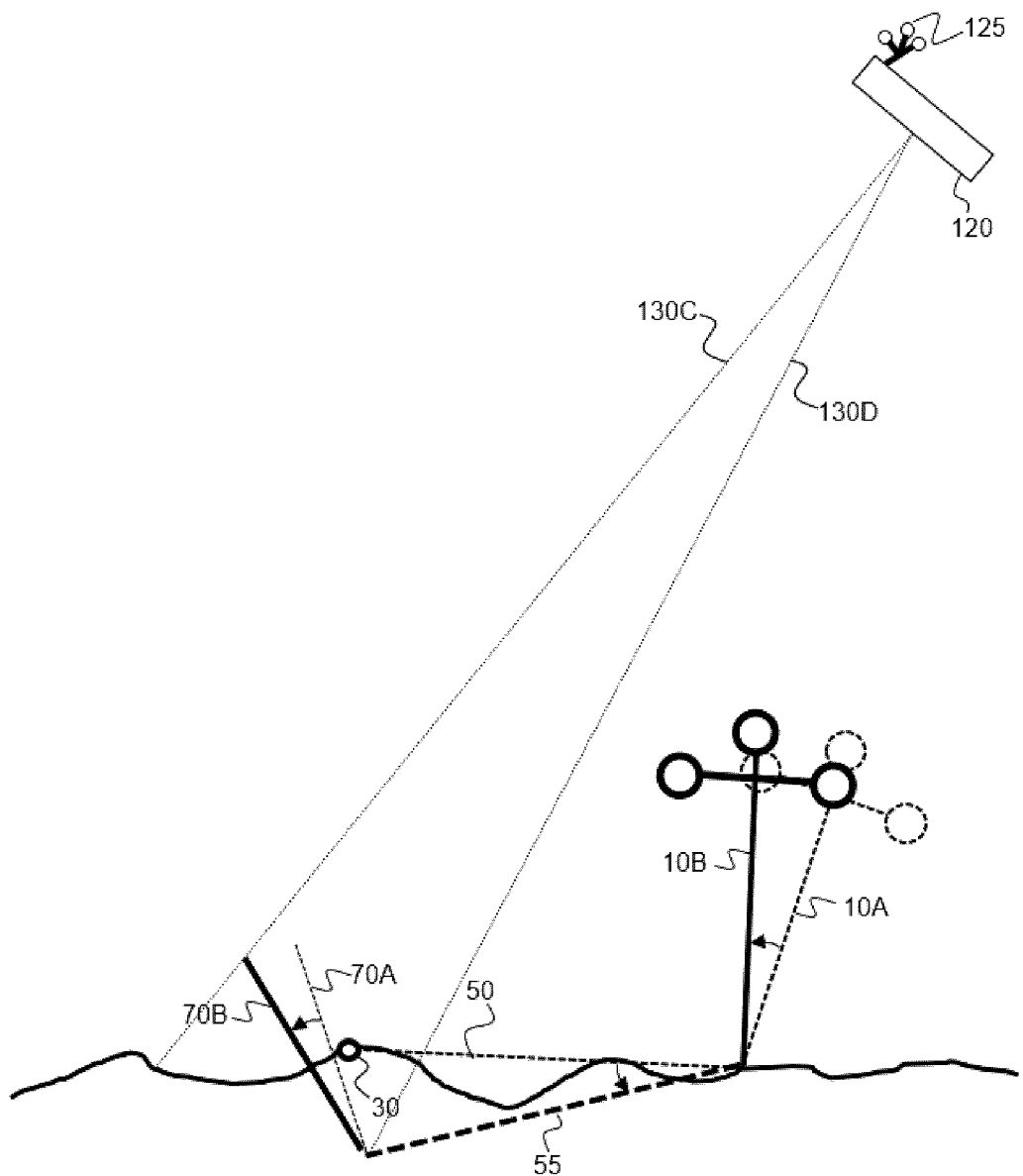

FIGS. 6B and 6C illustrate a single-camera example implementation involving a linear segment. If the position of the trackable reference marker does not vary, then the calculated position and orientation of the virtual linear segment 70 does not change, as shown in FIG. 6B. As such, an annotation generated in an image acquired by camera 120 will extend from the intersection of the ray 130A with surface 20 to the intersection of the ray 130B with the surface 20 (extending to the left of the landmark 30).

If, however, the trackable reference frame is disturbed and is rotated by an angle θ, the virtual linear segment is shifted and rotated. This is shown in FIG. 6C, in which the computed position and orientation of the virtual linear segment is shifted and rotated from the initial position and orientation 70A to the updated position and orientation 70B. An annotation generated in an image acquired by camera 120 will now extend from the intersection of the ray 130C with surface 20 to the intersection of the ray 130D with the surface 20 (extending on either side of the landmark 30). When compared to FIG. 6B, it is clear that the annotation in the image acquired from camera 100 will be shifted to the right and will no longer point directly at the landmark, thereby indicating a loss of registration.

Although many of the preceding example embodiments have described the generation of a visible indication of the estimated updated position of the landmark via an annotation made to an image, in other example embodiments, the visible indication can be generated by directing or projecting an optical beam onto the subject. For example, an optical device, such as an optical projector or a light source coupled to an optical scanning system, can be employed to direct an optical beam toward the estimated updated location of the landmark. For example, referring to FIG. 1F, one or more of the cameras 100 and 105 could be replaced with optical devices that direct optical beams along the rays 110 and 115 between the devices and the estimated updated position 40 of the landmark. The optical beams would generate a visible optical marking on the surface 20 of the subject at the intersection of the optical beams with the surface, as shown at 60 and 65. It will be understood that the present example optical-projection-based implementation may likewise be readily adapted to the other example embodiments described herein or variations thereof. For example, the projection need not be single spot, but could be a more complex optical pattern, such as a crosshair. A projected optical beam may also define an elongate optical image, such as linear segment, or an image of a tool.

Figure 7:
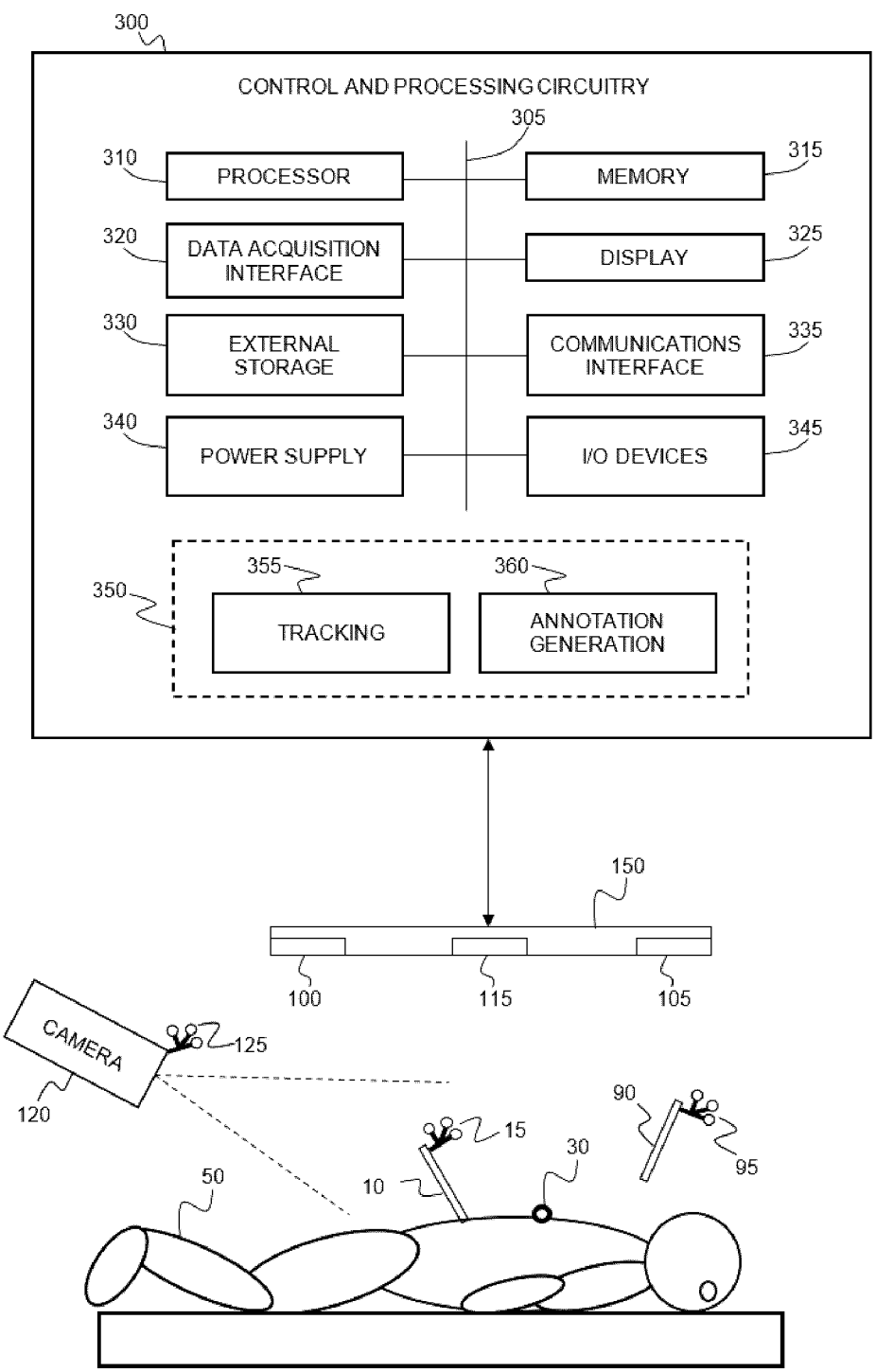
FIG. 7 shows an example system for generating a visible indication of registration accuracy during a medical procedure.

Referring now to FIG. 7, an example surgical guidance system is shown. The example guidance system may be employed, for example, for an intraoperative orientation of a tracked medical instrument 90 (having fiducial markers 95) relative to pre-operative volumetric image data that is spatially registered to an intraoperative frame of reference. Such registration may be facilitated, for example, via a surface detection system (non-limiting examples of suitable surface detection systems include photogrammetry systems, stereo vision systems, and structured light detection systems) to facilitate the registration of volumetric image data with the patient in an intraoperative frame of reference (e.g. via a structured light projector), or other systems and methods may be employed in the alternative. For example, in one alternative implementation, an intraoperative CT scan may be performed with a reference array of fiducial marker locations attached to the patient to facilitate direct intraoperative registration of volumetric image data with the patient.

The example system includes a tracking system 150 which may be employed to track the position and orientation of one or more trackable medical instruments 90 and to track the position and orientation of the trackable reference frame 10 (having fiducial markers 15). The tracking system 150 is operably interfaced with control and processing hardware 300. The tracking system 150 may be any suitable system for tracking one or more fiducial markers. An example of a tracking system is an optical tracking system operating with visual or infrared light that may employ stereo cameras to detect the positions of passive optical markers (e.g. reflective spheres) and/or active optical markers (e.g. light emitting diodes (LEDs)). Other non-limiting examples of tracking systems include electromagnetic tracking systems and surface imaging tracking systems.

In the example implementation shown in FIG. 7, the tracking system 150 is a stereoscopic optical tracking system including stereo cameras 100 and 105 with integrated infrared illumination (e.g. via illumination source 115). Due to their high reflectivity to infrared light, the fiducial markers can be easily localized in each image of the two cameras. These image positions can be employed to calculate the three-dimensional position of each fiducial marker by geometrical triangulation. The triangulation process can be performed, for example, by first calculating the center of mass of each of the detected markers in both camera views of the stereo calibrated camera system. This yields a set of marker points in both camera views from which the disparity between corresponding points in both views can then be calculated. This disparity along with the x and y pixel locations of each marker in one of the camera views can then be transformed into a three-dimensional spatial coordinate (in a coordinate system of the tracking system 150) using a perspective transformation. If at least three fiducial markers are rigidly attached to the medical instrument 90 or trackable reference frame 10, it is possible to compute its position and orientation (the six degrees of freedom).

In some example illustrations provided herein, the fiducial markers 45 for the optical tracking system are shown as reflective spheres, which are commonly used for passive optical tracking. However, any other type of markers, or marker attributes, can be used depending on the used tracking system such as, but not limited to, active markers (i.e. LEDs, which do not require integration of additional lighting and electromagnetic markers) and passive markers (e.g. glyphs, varying marker color, varying marker size, varying marker shape). It is to be understood that in some embodiments, less than three markers may be employed for position and location tracking. For example, a single marker may be provided for position and location tracking, provided that the single marker includes sufficient spatial structure and/or content. An example of such a single marker is a glyph including co-planar spatial features such as corner or edge features.

In one example implementation, an integrated tracking and surface detection system may be employed to perform simultaneous tracking and acquisition of anatomical surfaces using an integrated system, for example, as described in International Patent Application No. PCT/CA2011/050257, which is hereby incorporated by reference in its entirety.

In example implementations involving the use of camera images (e.g. example implementations employing camera images for identification of the initial position of the landmark, and/or example implementations involving the annotation of camera images to display an annotation indicative of the estimated updated location of the landmark), one or more cameras of the tracking system, if optical, may be employed to acquire the camera images. In alternative example implementations, such as those illustrated in FIGS. 6A-6C, a separate camera 120 may be employed (the camera 120 may be rigidly secured relative to the tracking system 150 or may be trackable by the tracking system, e.g. via fiducial markers 125).

FIG. 7 also illustrates an example implementation of control and processing hardware 300, which includes one or more processors 310 (for example, a CPU/microprocessor), bus 305, memory 315, which may include random access memory (RAM) and/or read only memory (ROM), a data acquisition interface 320, a display 325, external storage 330, one more communications interfaces 335, a power supply 340, and one or more input/output devices and/or interfaces 345 (e.g. a speaker, a user input device, such as a keyboard, a keypad, a mouse, a position tracked stylus, a position tracked probe, a foot switch, and/or a microphone for capturing speech commands).

It is to be understood that the example system shown in FIG. 7 is illustrative of a non-limiting example embodiment and is not intended to be limited to the components shown. Furthermore, one or more components of the control and processing hardware 300 may be provided as an external component that is interfaced to a processing device. For example, as shown in the figure, one or both of the tracking system 150 and the camera 120 may be included as a component of control and processing hardware 300 or may be provided as one or more external devices.

Although only one of each component is illustrated in FIG. 7, any number of each component can be included in the control and processing hardware 300. For example, a computer typically contains a number of different data storage media. Furthermore, although bus 305 is depicted as a single connection between all of the components, it will be appreciated that the bus 305 may represent one or more circuits, devices or communication channels which link two or more of the components. For example, in personal computers, bus 305 often includes or is a motherboard. Control and processing hardware 300 may include many more or less components than those shown.

Control and processing hardware 300 may be implemented as one or more physical devices that are coupled to processor 310 through one of more communications channels or interfaces. For example, control and processing hardware 300 can be implemented using application specific integrated circuits (ASICs). Alternatively, control and processing hardware 300 can be implemented as a combination of hardware and software, where the software is loaded into the processor from the memory or over a network connection.

Some aspects of the present disclosure can be embodied, at least in part, in software. That is, the techniques can be carried out in a computer system or other data processing system in response to its processor, such as a microprocessor, executing sequences of instructions contained in a memory, such as ROM, volatile RAM, non-volatile memory, cache, magnetic and optical disks, or a remote storage device. Further, the instructions can be downloaded into a computing device over a data network in a form of compiled and linked version. Alternatively, the logic to perform the processes as discussed above could be implemented in additional computer and/or machine readable media, such as discrete hardware components as large-scale integrated circuits (LSI's), application-specific integrated circuits (ASIC's), or firmware such as electrically erasable programmable read-only memory (EEPROM's) and field-programmable gate arrays (FPGAs).

A computer readable medium can be used to store software and data which when executed by a data processing system causes the system to perform various methods. The executable software and data can be stored in various places including for example ROM, volatile RAM, non-volatile memory and/or cache. Portions of this software and/or data can be stored in any one of these storage devices. In general, a machine-readable medium includes any mechanism that provides (i.e., stores and/or transmits) information in a form accessible by a machine (e.g., a computer, network device, personal digital assistant, manufacturing tool, any device with a set of one or more processors, etc.).

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. As used herein, the phrases "computer readable material" and "computer readable storage medium" refer to all computer-readable media, except for a transitory propagating signal per se.

Embodiments of the present disclosure can be implemented via processor 310 and/or memory 315. For example, the functionalities described below can be partially implemented via hardware logic in processor 310 and partially using the instructions stored in memory 315. Some embodiments are implemented using processor 310 without additional instructions stored in memory 315. Some embodiments are implemented using the instructions stored in memory 315 for execution by one or more microprocessors, which may be general purpose processors or specialty purpose processors. Thus, the disclosure is not limited to a specific configuration of hardware and/or software.

The control and processing hardware 300 is programmed with subroutines, applications or modules 350, that include executable instructions, which when executed by the one or more processors 310, causes the system to perform one or more methods described in the present disclosure. Such instructions may be stored, for example, in memory 315 and/or other internal storage.

For example, the tracking of trackable reference frame 10 and the determination of the initial position of the landmark may be performed by the tracking module 355 of the control and processing hardware 300, and the annotation generation module 360 may be employed to augment one or more intraoperative camera images, with one or more annotations indicative of the estimated updated location of the landmark.

Furthermore, in example implementations involving the use of a surface detection for intraoperative surface detection, a registration module (not shown) may include executable instructions for registering segmented surface data (obtained from the volumetric image data) with intraoperative surface data that is obtained using a surface detection system. For example, the volumetric image data may be provided to the control and processing hardware 300 for registration to intraoperatively acquired surface data.

The registration module performs image registration between a segmented surface generated from the volumetric image data 30 and the intraoperative surface data. Non-limiting examples of surface segmentation methods include non-template-based methods and methods which utilize anatomical shape models. Non-template-based methods can utilize geometrical properties, such as connectivity, surface normals, and curvatures to determine the boundary of the segmented region, or statistical properties, such as variance from nearby neighboring points on the surface. Methods based on anatomical shape models can utilize a pre-computed atlas (e.g. of vertebra) as a template to perform the segmentation. Both classes of method can also be used in combination. In all these methods, one or more volumetric fiducial points can serve as a seed point to initialize the segmentation process. Alternatively, for segmentation methods which are fully automatic and operate on the entire volumetric data (which are usually based on anatomical atlases), one or more volumetric fiducials can be used to tag the level(s) of interest.

Surface registration may be performed as an initial registration based on correspondence between volumetric fiducial points defined in the volumetric image data and respective intraoperative fiducial points identified on a segmented surface. After generating the initial registration, a surface-to-surface registration may then be performed, between the segmented surface data and the intraoperative surface data, thereby obtaining a registration transform. The registration transforms maps the segmented surface in the volumetric frame of reference to the intraoperative surface data. It will be understood that any suitable surface registration method may be employed to perform registration between surfaces, when performing methods according to the example embodiments disclosed herein. Non-limiting examples of suitable registration methods include the iterative closest point algorithm, wherein the distance between points from difference surfaces are minimized.

In one example case in which the surface detection system is a structured light detection system, a projection device is employed to project surface topography detection light onto a region of interest, and one or more cameras detect surface topography light that is scattered or reflected from the region of interest. The detected optical signals can be used to generate surface topography datasets consisting of point clouds or meshes. More specifically, the projection device projects temporally and/or spatially modulated light onto the surface to be imaged, while the camera(s) capture images of the illuminated surface. This active illumination enables robust and efficient identification of pixel correspondences between calibrated camera-projector (a projector may be thought of as an inverse camera) or calibrated camera-camera system. The correspondence (disparity) data can then be transformed into real-space coordinate data in the coordinate system of the calibrated camera(s) and/or projector(s) by geometrical triangulation. During a surgical procedure, the structured light detection system may be positioned such that three-dimensional surface of the surgical site (e.g. the bony surfaces of an exposed spine) is acquired. The created virtual representation of the three-dimensional surface is then registered to volumetric image data 30 (e.g. CT, MRI, US, PET, etc.) by the registration module, using, for example, methods described in International Patent Application No. PCT/CA2011/050257. The volumetric image data 30 may be pre-operatively acquired but is not necessarily pre-operatively acquired. For example, in some applications, the volumetric image data may also be intraoperatively acquired.

In order to represent a trackable medical instrument in a navigation image, a calibration transformation is determined between the reference frames of the surface detection system and the reference frame of the tracking system 150. If the relative position of the tracking system and the surface imaging system is fixed, this calibration may be performed by obtaining the position of at-least 3 points from a calibration object from both systems, and aligning these points to obtain the calibration transformation, as described in International Patent Application No. PCT/CA2011/050257. In an alternative embodiment, as disclosed in International Patent Application No. PCT/CA2011/050257, the surface detection device may have fiducial markers attached thereto, and the fiducial markers may be tracked by the tracking system. In this configuration, a calibration procedure can be employed to obtain the calibration transformation from the frame of reference of the surface detection system to the frame of reference of the tracking system using the attached fiducial markers. The calibration transformation between the coordinate system of the tracking system and the surface imaging system is then continuously updated as the position of surface imaging device is changed.

After performing calibration, the calibration transformation between the coordinate system of the tracking system and the surface imaging system is known. Registering the surface datasets and volumetric image data is therefore equivalent to identifying the position of the volumetric image data in the coordinate system of the tracking system. As a result, any trackable medical instrument 90, which is afterwards tracked with the tracking subsystem, can be presented to the surgeon as an overlay of the medical instrument 90 on the registered 3D image data on a display or other visualization devices.

To compensate for patient or system motion, it is also advantageous to use a tracked device attached to the patient's anatomy (e.g. to a skeletal feature of the patient's anatomy). Accordingly, as shown in FIG. 7, the position of a trackable reference frame 10 is recorded by the tracking system at the same time (i.e. within a time duration that is sufficiently small to preclude errors associated with patient motion) as when the surface dataset is acquired. The surface dataset is transformed to the coordinate system of tracking system (using the previously acquired calibration transformation) and is then registered to the volumetric image data. Subsequent tracking of medical instruments relative to the volumetric image data can be performed based on the trackable reference frame, with compensation for patient or system motion, without the need for continuous acquisition of surface data. As explained in detail above, the example embodiments disclosed herein facilitate a visual determination of the loss of registration that occurs when the trackable reference frame 10 is inadvertently moved relative to the subject.

Although many of the preceding example implementations depend on generating a visible indication through augmentation of camera images, in other example implementations, an alert to the user may be automatically generated with or without the use of visible indication. For example, once the initial position of the landmark is determined (according to an example method described above), an image region containing at least a portion of the landmark may be selected from the intraoperative camera image. The image region may be identified via input received from a user. Alternatively, the image region may be determined autonomously. For example, a fixed radius about the in the initial position of the landmark may be automatically segmented. In other implementations, the initial position of the landmark may be used as a seed point to initiate a region growing algorithm. The region growing algorithm may be based on, but not limited to, using and combination of intensity, gradients, curvatures or normals.

A feature descriptor can then be generated which describes the landmark In computer vision, a feature descriptor encodes information about a feature and its local image region, providing a numerical/digital "fingerprint" that enables detection of a feature in other images. A feature detection algorithm can then be used to track the position of the landmark 30 within the camera image as characterized by its descriptor at subsequent time points. It is noted that this tracking can be performed without a priori knowledge of the landmark characteristics.

Once the landmark position within the image (the intra-image landmark location) is tracked it can be directly compared with the estimated updated location of the landmark (generated as per example methods described above). This comparison can be performed, for example, in the 2D image space, via a determination of the spatial offset between the intra-image landmark location and the estimated updated location of the landmark within the image. If the difference (spatial offset) between the estimated updated location and the actual tracked location of the landmark exceeds a certain threshold, an alert can be generated to warn the user of a loss of registration. Non-limiting examples of alerts are audible, visible or numeric alerts which quantify the difference. In implementations involving multiple cameras, per-camera intra-image landmark locations can be determined and processed to determine a three-dimensional location of the landmark based on known orientations of the cameras. This three-dimensional location can be compared to the estimated updated landmark position to determine a spatial offset.

In some embodiments, for example in closed loop robotic applications, when an alert is generated it may automatically trigger a correction process to subsequently reregister the anatomy of interest. For example, if three or more non-collinear landmarks are identified and are tracked using the feature detection methods in 3D space as described above, automatic determination and correction of reference frame movement may be achieved. At any time point, the 3D position of the three or more landmarks, in the coordinate system of the trackable reference frame, whose position is determined via feature detection can be registered, for example using a landmark transform, to the estimated updated landmark position of the three or more landmarks, thereby generating a transform which describes the loss of registration. An example of a suitable landmark transform is the vtkLandmarkTransform, which is defined by two sets of landmarks, and where the transform provides the best fit mapping one onto the other, according to a least squares calculation. This transform can then be applied to correct the registration at the current time point.

In another example embodiment, the use of a specific landmark and identification of the landmark may not be necessary by simply using all or some portion of surface data generated from a surface detection system and augmenting the camera image with the surface data in the same way that the annotation object is used to augment the camera image. For example, as in the preceding example embodiments, a tracking system may be employed detect an initial position and orientation of a trackable reference frame secured relative to a subject. A surface detection system may also be employed to detect intraoperative surface data characterizing a surface region (e.g. a region of the subject, or a region adjacent to the subject, such as draping, retractor systems and other mechanical structures such as a bed or instrument stand). The surface detection system may be tracked by the tracking system, or may be rigidly secured relative to the tracking system, or may be integrated with the tracking system (e.g. both systems may employ common cameras), such that a known spatial relationship exists between the surface detection system and the tracking system.

At a subsequent time during the medical procedure, the tracking system is employed to detect an updated position and orientation of the trackable reference frame and a camera is employed to obtain an intraoperative image. The intraoperative image includes at least a portion of the surface region. A known spatial relationship exists between the camera and one or both of the tracking system and the surface detection system. For example, the camera may be tracked by the tracking system, or the camera may be rigidly secured relative to one or both of the tracking system and the surface detection system, or the camera may be integrated with one or both of the tracking system and the surface detection system.

The intraoperative surface data is then transformed according to a difference between the updated position and orientation of the trackable reference frame and the initial position and orientation of the trackable reference frame, such that the transformed intraoperative surface data remains fixed relative to the trackable reference frame. This may be performed, for example, by employing the known spatial relationship between the surface detection system and the tracking system to represent the intraoperative surface data in a coordinate system associated with the tracking system and the transforming the intraoperative surface data based on the difference in the initial and updated position and orientation of the tracking system. In other words, the intraoperative surface data is transformed such that it "moves with" or is fixed relative to the trackable reference frame when the trackable reference frame is perturbed from its initial location.

The transformed intraoperative surface data may then employed to generate an annotation within the intraoperative image. This can be done by using the known spatial relationship between the camera and the tracking system to directly transform the transformed intraoperative surface data into the coordinate system of the camera sensor or alternatively by first transforming the transformed intraoperative surface into the camera 3D coordinate system and then applying the cameras perspective transform to map the surface data onto the camera image. The annotation facilitates detection of registration error due to motion of the trackable reference frame relative to the subject via observation of an offset between surface features of the surface annotation and corresponding surface features visible in the intraoperative image. In some example implementations, the annotation may be generated and displayed via a head-mounted display, such as a heads-up display or a virtual reality headset, as described previously.

Examples

The following examples are presented to enable those skilled in the art to understand and to practice embodiments of the present disclosure. They should not be considered as a limitation on the scope of the disclosure, but merely as being illustrative and representative thereof.

Figure 8A:
FIGS. 8A-8C are photographs showing examples of different types of annotations indicative of the estimated updated location of the landmark in left and right camera images.
Figure 8B:
Figure 8C:
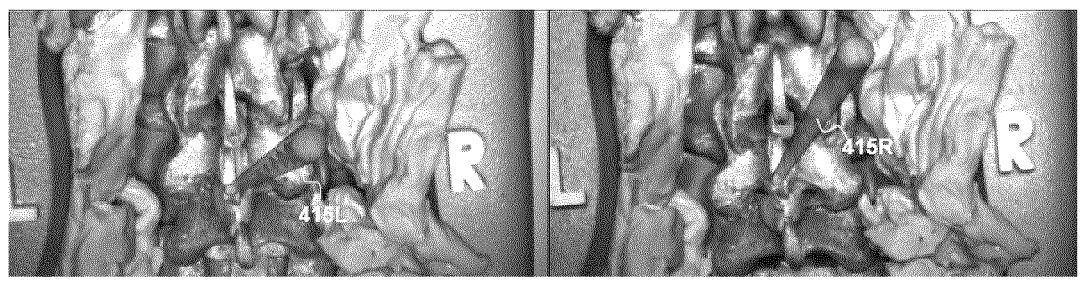

FIGS. 8A-8C are photographs showing examples of different types of annotations indicative of the estimated updated location of the landmark in left and right camera images. FIG. 8A shows a bone screw implanted into the spinous process of vertebra in a model spine, shown at 400L and 400R in the left and right images, respectively. FIG. 8B shows, at 410L and 410R in the left and right images, respectively, an example virtual designation on the camera images of the landmark. FIG. 8C show an elongate virtual object designating the landmark at 415L and 415R in the left and right images, respectively.

Figure 9A:
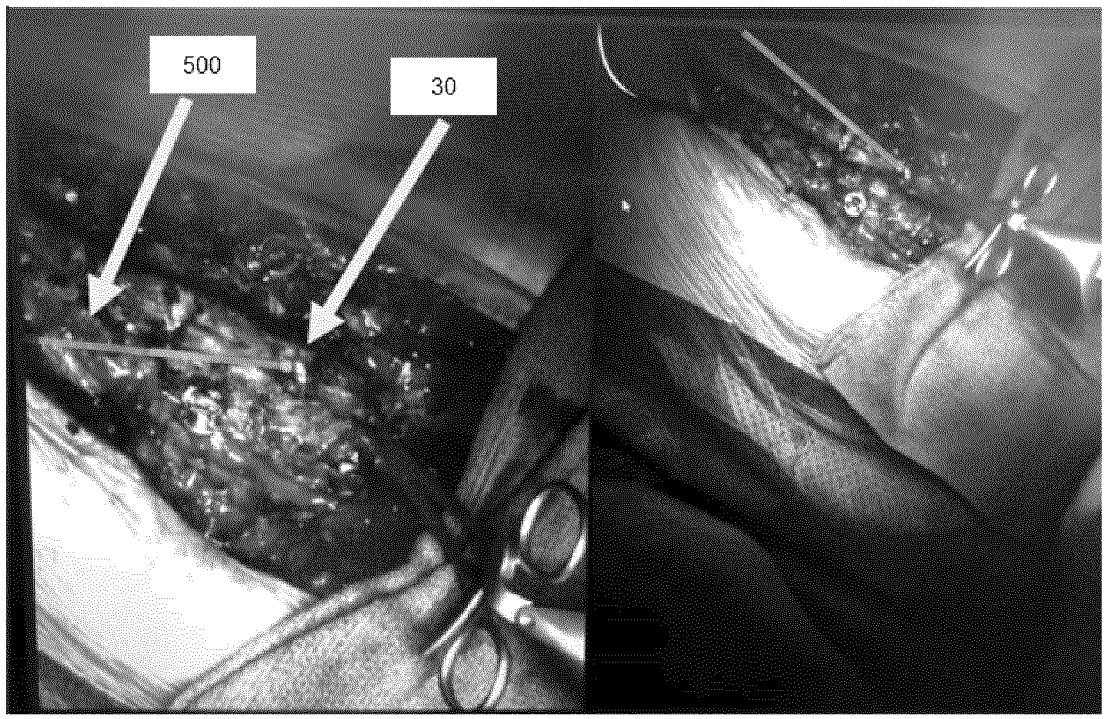
FIGS. 9A and 9B are photographs showing the use of a linear annotation to indicate the estimated updated location of a landmark (based on detected changes in the orientation of a trackable reference frame) in camera images showing the landmark, where
Figure 9B:
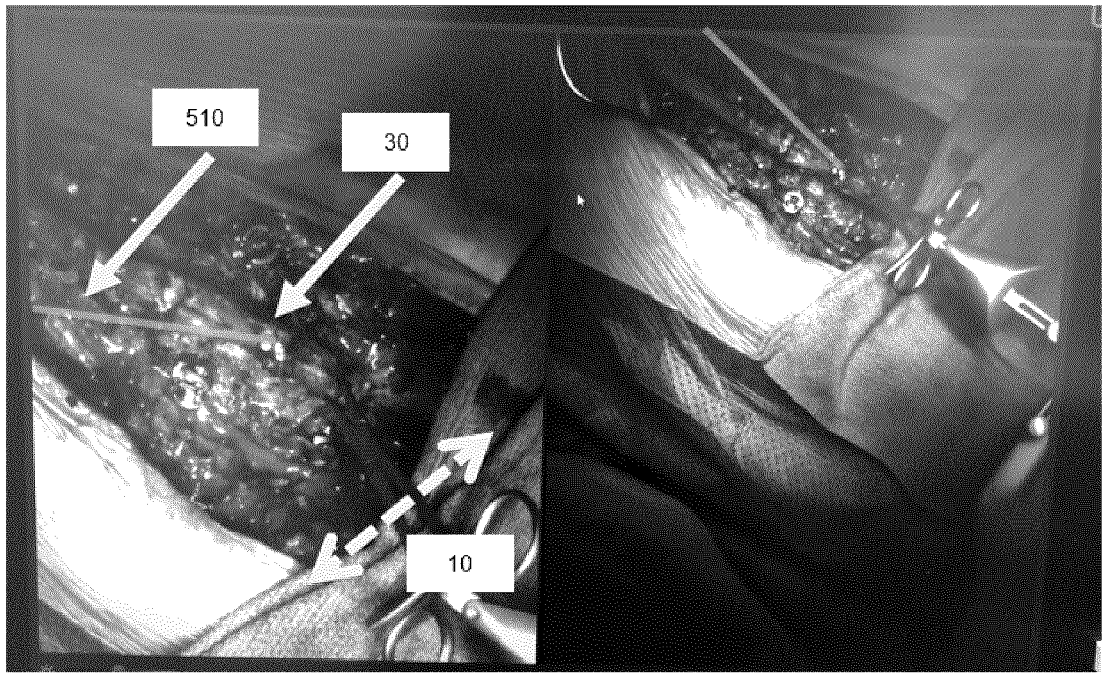

FIGS. 9A and 9B are photographs showing the use of a linear annotation to indicate the estimated updated location of a landmark (based on detected changes in the orientation of a trackable reference frame) in camera images showing the landmark, where FIG. 9A shows the linear annotation 500 pointing at a bone screw 30 and FIG. 9B shows the linear annotation 510 laterally offset from the bone screw 30 due to motion of the trackable reference frame 10, thereby indicating a loss of registration.

Figure 10C:
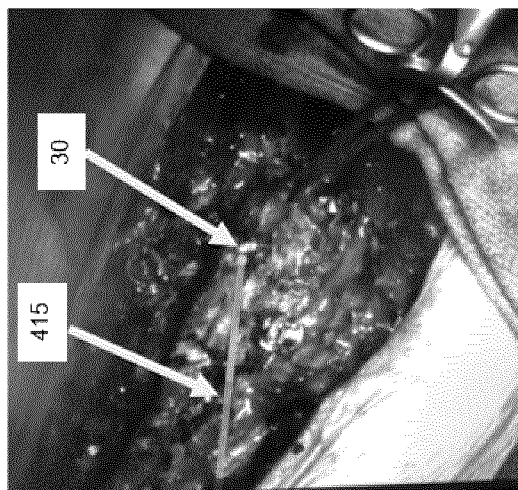
FIGS. 10A-10C are photographs showing the use of a linear annotation to indicate the estimated updated location of a landmark (based on detected changes in the orientation of a trackable reference frame) in camera images showing the landmark, where
Figure 10B:
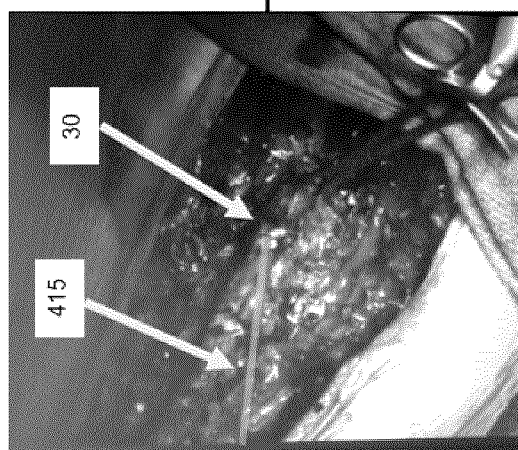
Figure 10A:
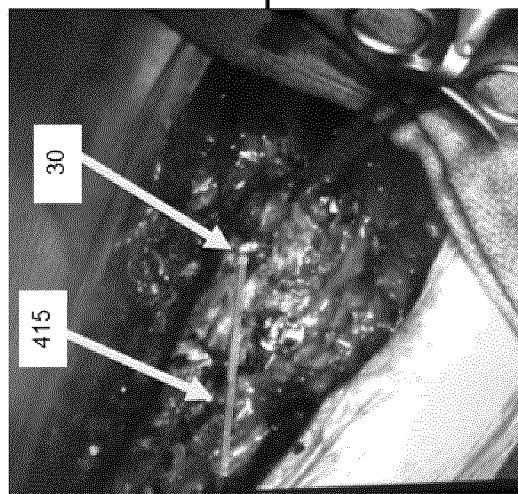

FIGS. 10A-10C are photographs showing the use of a linear annotation to indicate the estimated updated location of a landmark (based on detected changes in the orientation of a trackable reference frame) in camera images showing the landmark, where FIG. 10A shows the linear annotation 415 pointing at a bone screw 30, FIG. 10B shows the linear annotation 415 laterally offset from the bone screw 30 due to motion of the trackable reference frame, thereby indicating a loss of registration, and FIG. 10C shows the linear annotation 415 again being directed at the bone screw 30 after correction of the registration error.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of generating a visible indication of registration accuracy during a medical procedure, the method comprising:
employing a tracking system to detect an initial position and orientation of a trackable reference frame secured relative to a subject;
obtaining landmark position information facilitating a determination of a corresponding initial position of an intraoperatively exposed landmark relative to the trackable reference frame, wherein the landmark is visible on the subject and is absent of fiducial markers trackable by the tracking system; and
at a subsequent time during the medical procedure:
employing the tracking system to detect an updated position and orientation of the trackable reference frame;
employing the updated position and orientation of the trackable reference frame to determine an estimated updated position of the landmark such that the estimated updated position of the landmark remains fixed relative to the trackable reference frame; and
generating the visible indication locating the estimated updated position of the landmark on the subject such that the estimated updated position of the landmark is observable, on the subject, relative to an actual position of the landmark on the subject, thereby facilitating visual detection of registration error due to motion of the trackable reference frame relative to the subject via observation of an offset between the estimated updated position of the landmark and the actual position of the landmark.

2. The method according to claim 1 wherein the landmark position information comprises a first location identified within a first camera image and a second location identified within a second camera image, wherein the first camera image is obtained from a first camera having a first view angle and the second camera image is obtained from a second camera having a second view angle, wherein the first camera image and the second camera image include the landmark, the first camera being fixed relative to the second camera; and
wherein the first location and the second location are processed to determine the initial position of the landmark, such that the initial position of the landmark and the initial position and orientation of the trackable reference frame are represented in a common frame of reference.

3. The method according to claim 2 wherein the landmark position information is obtained by:
receiving, from a user, via a graphical user interface, first input identifying the first location of the landmark within the first camera image; and
receiving, from the user, via the graphical user interface, second input identifying the second location of the landmark within the second camera image.

4. The method according to claim 2 wherein the landmark position information is obtained by:
receiving, from a user, via a graphical user interface, first input identifying the first location of the landmark within the first camera image; and
employing one or more features associated with the landmark in the first camera image to:
process the second camera image and identify the landmark within the second camera image; and
determine the second location of the landmark within the second camera image.

5. The method according to claim 2 wherein the landmark position information is obtained by:
obtaining the first camera image and the second camera image while a pointing instrument is positioned, by a user, to indicate the landmark, such that the first camera image and the second camera image include the pointing instrument and the landmark; and
processing the first camera image and the second camera image to identify, based on one or more known properties associated with the pointing instrument, the landmark and to determine a first selected location and second selected location of the landmark within the first camera image and the second camera image, respectively.

6. The method according claim 3 wherein a known transformation between (i) a frame of reference associated with the first camera and the second camera and (ii) a frame of reference of the tracking system, is employed to represent the initial position of the landmark and the initial position and orientation of the trackable reference frame in the common frame of reference, thereby facilitating the determination of the initial position of the landmark relative to the trackable reference frame.

7. The method according to claim 3 wherein the first camera and the second camera are components of the tracking system, such that the initial position of the landmark and the initial position and orientation of the trackable reference frame inherently reside within the common frame of reference.

8. The method according to claim 1 wherein the landmark position information is obtained by receiving, from the tracking system, tracking information identifying a position and orientation of a trackable instrument when the trackable instrument is positioned, by a user, to indicate the landmark; and
wherein the position and orientation of the trackable instrument are employed to determine the initial position of the landmark in a frame of reference of the tracking system.

9. The method according to claim 8 wherein the trackable instrument is configured to project an optical beam from a distal end thereof, and wherein the trackable instrument comprises a distance sensor configured to determine a distance between the distal end and the intersection of the optical beam with a surface; and
wherein the position and orientation of the trackable instrument, and the distance measured by the distance sensor, when the optical beam is directed at the landmark, are employed to determine the location of the landmark in the frame of reference of the tracking system.

10. The method according to claim 1 wherein the visible indication is generated in as annotation within an image displayed on a user interface, the image having been acquired by a camera having a known spatial relationship with the tracking system, wherein the image includes the landmark.

11. The method according to claim 10 wherein the annotation spatially overlaps with the estimated updated position of the landmark.

12. The method according to claim 10 wherein the annotation provides an indication of the estimated updated position of the landmark without spatially overlapping with the estimated updated position of the landmark.

13. The method according to claim 10 wherein the annotation is based on a computed virtual elongate object that spatially extends from the estimated updated position of the landmark.

14. The method according to claim 10 wherein the annotation is generated based on a projection of a virtual elongate object that spatially extends a location residing less than 5 mm from the estimated updated position of the landmark.

15. The method according to claim 14 wherein an orientation of the virtual elongate object is selected such that in the absence of registration inaccuracy, the annotation appears in the image as a dot, and such that in the presence of registration inaccuracy, the annotation appears as a segment.

16. The method according to claim 14 wherein an orientation of the virtual elongate object, in the absence of registration inaccuracy, is selected according to an orientation of the camera.

17. The method according to claim 10 wherein the location of the annotation within the image is determined by employing a known transformation between a frame of reference of the tracking system and a frame of reference of the camera.

18. The method according to claim 17 wherein the camera is rigidly mounted relative to the tracking system.

19. The method according to claim 17 wherein the camera is a component of the tracking system.

20. The method according to claim 1 wherein the visible indication is generated by controlling a light source to direct an optical beam toward the location of the landmark on the subject.

21. The method according to claim 1 wherein the landmark is an anatomical landmark.

22. The method according to claim 1 wherein the landmark is a non-anatomical landmark residing on an object secured to the subject.

23. The method according to claim 22 wherein the object is an implant.

24. The method according to claim 22 wherein the landmark is a feature residing on an implant.

25. The method according to claim 23 wherein the implant is a bone screw.

26. A system for generating a visible indication of registration accuracy during a medical procedure, the system comprising:
control and processing circuitry comprising at least one processor and associated memory, said memory comprising instructions executable by said at least one processor for performing operations comprising:
controlling a tracking system to detect an initial position and orientation of a trackable reference frame secured relative to a subject;
receiving landmark position information facilitating a determination of a corresponding initial position of an intraoperatively exposed landmark relative to the trackable reference frame;
subsequently controlling the tracking system to detect an updated position and orientation of the trackable reference frame;
processing the updated position and orientation of the trackable reference frame to determine an estimated updated position of the landmark such that the estimated updated position of the landmark remains fixed relative to the trackable reference frame; and
controlling one of a display device and an optical device to generate the visible indication locating the estimated updated position of the landmark on the subject such that the estimated updated position of the landmark on the subject is observable, relative to an actual position of the landmark on the subject, thereby facilitating visual detection of registration error due to motion of the trackable reference frame relative to the subject via observation of an offset between the estimated updated position of the landmark and the actual position of the landmark.

* * * * *